(12) United States Patent
Minami et al.

(10) Patent No.: US 7,072,762 B2
(45) Date of Patent: Jul. 4, 2006

(54) EVALUATION SYSTEM FOR VEHICLE OPERATING CONDITIONS AND EVALUATION METHOD THEREOF

(75) Inventors: Katsuaki Minami, Nagano (JP); Satoshi Kumagai, Nagano (JP); Takao Hamuro, Nagano (JP); Hideki Nagahara, Nagano (JP)

(73) Assignee: Miyama, Inc., Nagano (JP)

( * ) Notice: Subject to any disclaimer, the term of this patent is extended or adjusted under 35 U.S.C. 154(b) by 388 days.

(21) Appl. No.: 10/621,394

(22) Filed: Jul. 18, 2003

(65) Prior Publication Data

US 2005/0027423 A1 Feb. 3, 2005

(51) Int. Cl.
*G06F 7/00* (2006.01)
*G01F 9/00* (2006.01)

(52) U.S. Cl. .................. 701/123; 701/51; 701/104; 340/439; 73/113; 73/114

(58) Field of Classification Search ............... 701/123, 701/51, 104; 340/439; 123/406.23; 477/107; 73/113, 114
See application file for complete search history.

(56) References Cited

U.S. PATENT DOCUMENTS

| | | | | |
|---|---|---|---|---|
| 4,354,173 A | * | 10/1982 | Kuhn et al. ............ | 340/439 |
| 4,398,174 A | * | 8/1983 | Smith, Jr. ............ | 340/450.2 |
| 4,494,404 A | * | 1/1985 | Strifler ............ | 73/113 |
| 4,905,544 A | * | 3/1990 | Ganoung ............ | 477/109 |
| 4,909,103 A | * | 3/1990 | Morimoto ............ | 477/38 |
| 5,637,052 A | * | 6/1997 | Hirota et al. ............ | 477/61 |
| 6,092,021 A | * | 7/2000 | Ehlbeck et al. ............ | 701/123 |
| 2001/0008989 A1 | | 7/2001 | Minowa et al. | |

FOREIGN PATENT DOCUMENTS

| | | |
|---|---|---|
| EP | 1 191 313 A2 | 3/2002 |
| EP | 1 229 311 A2 | 8/2002 |
| JP | 2000-205925 | 7/2000 |
| JP | 2002-362185 | 12/2002 |

\* cited by examiner

*Primary Examiner*—Thomas G. Black
*Assistant Examiner*—Marie A. Weiskopf
(74) *Attorney, Agent, or Firm*—Rabin & Berdo, PC

(57) ABSTRACT

The evaluation system for vehicle operating conditions comprises an automatic control device (10, 27) for setting target vehicle operating conditions and controlling the vehicle so as to achieve the target operating conditions, and a display device (4) mounted on the vehicle. The system determines whether operation that worsens fuel economy has been performed or not on the basis of the operating conditions of the vehicle; determines the operating state of the automatic control device (10, 27) based on the operating conditions of the vehicle; computes the excess fuel consumption, which is the fuel amount consumed in excess by operation that worsens the fuel economy, based on operating conditions of the vehicle and the operating state of the automatic control device (10, 27); and displays the computed excess fuel consumption to the display device (4).

2 Claims, 12 Drawing Sheets

EVALUATION SYSTEM FOR VEHICLE OPERATING CONDITIONS AND EVALUATION METHOD THEREOF

BACKGROUND OF THE INVENTION

1. Field of the Invention

The present invention relates to a system for evaluating fuel economy and other vehicle operating conditions.

2. Description of the Related Art

The fuel economy display device disclosed in JP2000-205925A, which was published in the year 2000 by the Japan Patent Office, computes fuel consumption on the basis of the fuel injection pulse signal outputted from the engine control unit, computes the traveled distance on the basis of the vehicle speed pulse signal outputted from the vehicle speed sensor, and computes and displays the fuel economy by dividing the computed traveled distance by the fuel consumption. However, simply displaying the fuel economy cannot be said to be sufficient in aiding in the improvement of driving skills because it cannot be known how the driver can specifically improve driving operation to enhance fuel economy, and to what degree fuel economy is further enhanced by improving driving operation.

SUMMARY OF THE INVENTION

Miyama, inc. proposes a vehicle evaluation system in the Japanese Patent Application P2002-362185 wherein when rapidly accelerating or performing other operations that worsens fuel economy in a vehicle provided with a manual transmission, the extra amount of fuel thus consumed (excess fuel consumption) is computed and displayed to the driver. The driver can learn the driving operation that is the cause of worsening fuel economy since the excess fuel consumption is immediately shown when driving that worsens fuel economy is performed, and this can become a reference when improving driving operations.

In this system, nevertheless, the accelerator operation amount, the gear position (speed ratio) of the manual transmission, the vehicle speed, and other operating conditions are detected, and the excess fuel consumption is computed. Consequently, when an attempt is made to apply this system to a vehicle provided with a constant speed control device (automatic cruise controller), the engine output cannot be calculated from the accelerator operation amount and the engine rotational speed because the accelerator is not depressed while the constant speed control device is operating, and the excess fuel consumption cannot be computed as a result.

When this system is further applied to a vehicle provided with an automatic transmission with a torque converter, slippage occurs in the turbine and the torque converter pump, a discrepancy between work performed by the engine and work actually performed by the driving wheel arises due to the effect of the transmission efficiency of the torque converter, and the excess fuel consumption cannot be accurately computed.

In a vehicle provided with a constant speed control device, automatic transmission, or other automatic control device, the driving intention of the driver does not directly correspond to the engine rotational speed or the speed ratio. In other words, in a vehicle wherein a constant speed control device is applied, the driving intention of the driver appears as a command, such as maintaining vehicle speed, or accelerating and decelerating, to the constant speed control device, and in a vehicle wherein an automatic transmission is applied, the driving intention of the driver appears as the accelerator operation amount. Thus, an instructional method in which a higher speed gear is used to the extent possible while accelerating and running at constant speed, cannot be adopted.

An object of the present invention is to present useful information to the driver to improve operating techniques, and to enhance fuel economy by improving driving operation in a vehicle provided with a constant speed control device, an automatic transmission with a torque converter, or another automatic control device.

The present invention provides an evaluation system for vehicle operating conditions, comprising an automatic control device which sets target vehicle operating conditions and controls the vehicle so as to achieve the target operating conditions; a controller that functions to determine whether an operation that worsens fuel economy has been performed based on the operating conditions of the vehicle; determine the operating state of the automatic control device based on the operating conditions of the vehicle; and compute an excess fuel consumption which is a fuel amount consumed in excess by the operation that worsens the fuel economy based on the operating conditions of the vehicle and the operating state of the automatic control device, and a display device which displays the computed excess fuel consumption.

According to the present invention, a determination is made as to the operating state of the automatic control device installed in a vehicle based on the operating conditions of the vehicle, and the fuel amount consumed in excess (excess fuel consumption) by rapid acceleration or other type of driving that worsens fuel economy is computed with consideration given to the operating state of the automatic control device, and displayed to the driver. The driver can know of driving operations that cause fuel economy to worsen since driving that worsens fuel economy is immediately shown as an increase in excess fuel consumption and can improve driving operations with reference to this. The driver can be made aware of the degree that fuel economy worsened by his/her driving operation, and the driver can be prompted to improve his/her driving skill.

In vehicles comprising a constant speed control device or an automatic transmission with a torque converter serving as an automatic control device, the driver cannot directly command the gear position, but according to this invention the fuel amount consumed in excess by an inappropriate vehicle speed set in the constant speed control device, or inappropriate accelerator operation amount during automatic speed change can be shown to the driver, and driving skill can be improved even in vehicles with a constant speed control device, an automatic transmission or other automatic control device.

Adopting an approach in which the operating state of the automatic control device can be detected based on the vehicle operating conditions makes it easier to install this system in a vehicle and prevents the automatic control device from malfunctioning due to signal wire work or the like.

Preferred embodiments and advantages of the present invention will be described in detail below with reference to the following drawings.

BRIEF DESCRIPTION OF THE DRAWINGS

FIG. 5A is a map showing the relationship between the fuel consumption ratio and the engine torque, which corresponds to the accelerator operation amount (or the value corresponding to the accelerator operation amount, the throttle opening) and the engine rotational speed; and FIG. 5B is a map showing the relationship between the fuel consumption ratio and the engine torque, which corresponds to the accelerator operation amount (or the value corresponding to the accelerator operation amount) and the engine rotational speed.

DESCRIPTION OF THE PREFERRED EMBODIMENTS

Figure 1:
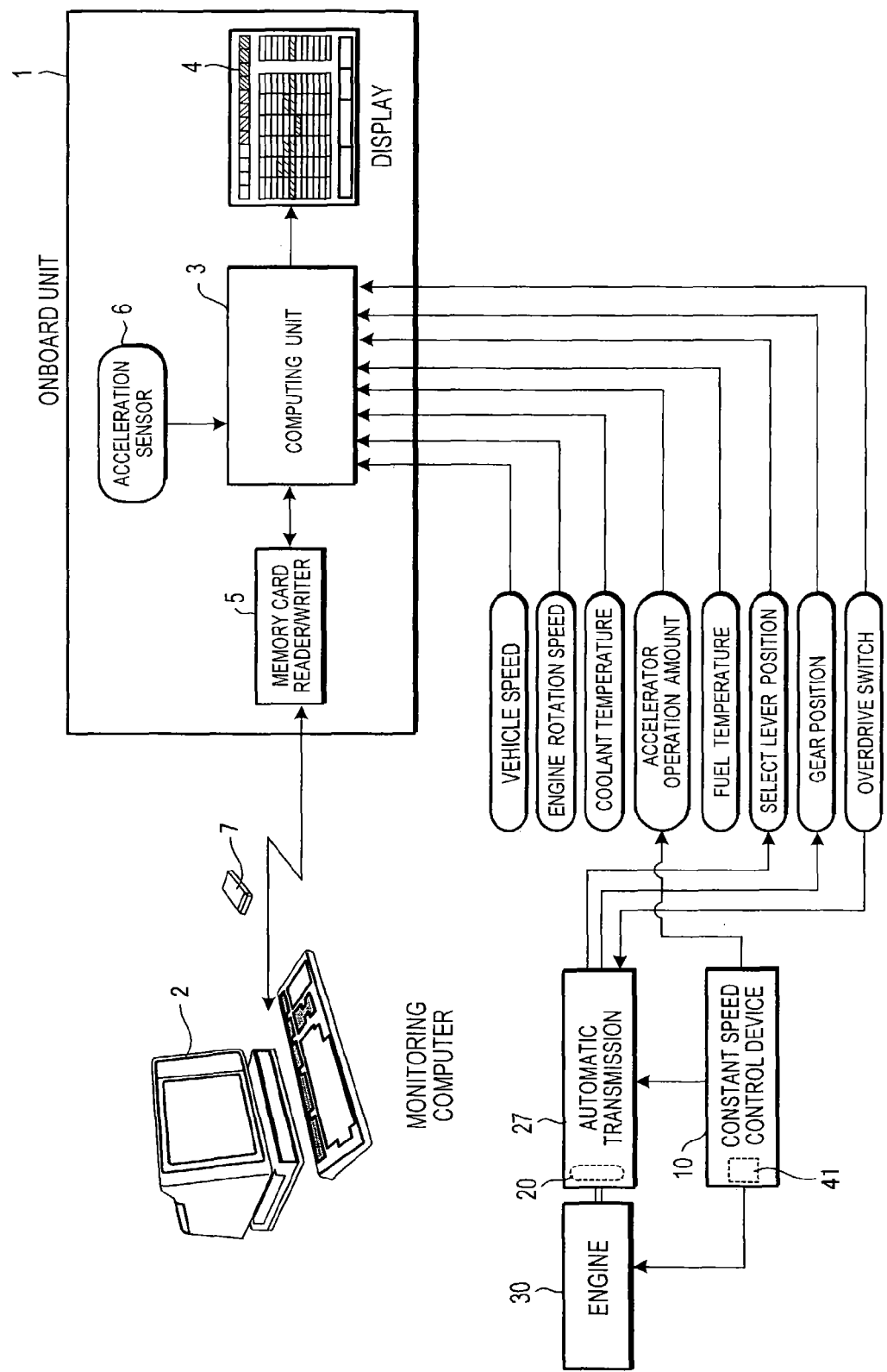
FIG. 1 is a block diagram showing the structure of the evaluation system for vehicle operating conditions related to the present invention.

FIG. 1 of the drawings is a block diagram showing the structure of the evaluation system for vehicle operating conditions related to the present invention, and shows the case in which application has been made to a vehicle provided with a constant speed control device 10 such as an auto cruise controller, and an automatic transmission 27 with a torque converter 20. This system comprises an onboard unit 1 mounted in the vehicle, which is the object of evaluation, and a monitoring computer 2 for monitoring the vehicle.

The onboard unit 1 comprises a computing unit 3 which includes a CPU, memory, and an input/output interface; a display 4 such as an LCD; a memory card reader/writer 5; and a built-in acceleration sensor 6. The display 4 is mounted in the vehicle in a position easily viewable by the driver.

The computing unit 3 receives a vehicle speed (the rotational speed of the driving wheel or driving axle) signal, a rotational speed signal of an engine 30, a coolant temperature signal, an accelerator operation amount signal, a fuel temperature signal, a select lever position signal, a gear position signal and other signals outputted from the vehicle, as well as an acceleration signal outputted from the built-in acceleration sensor 6.

The vehicle output signal may be obtained from the transmission control unit or the engine control unit, and may also be directly obtained from a sensor for detecting these signals without using the transmission control unit or the engine control unit. The gear position signal is a signal that is outputted from the automatic transmission 27 (or the transmission control unit). The speed ratio of each gear is set, so the speed ratio of the transmission 27 can be known on the basis of the gear position signal.

The transmission 27 comprises an overdrive switch for setting whether shift to the top gear (5th gear in the case of five forward gears, for example) is permitted or not, an L-range for securing the gear position in 1st gear, which increases the drive power, a 2-range for shifting using 1st gear and 2nd gear, a 3-range for shifting using 1st to 3rd gear, a D-range which serves as an automatic shift mode used in normal running, an R-range for reverse, an N-range for positioning the transmission 27 in neutral, and a P-range for parking.

The constant speed control device 10 controls the gear position of the automatic transmission 27 and the output of the engine 30 so as to achieve a target vehicle speed set by the driver.

The constant speed control device 10 comprises a start switch which starts the constant speed control, an accelerator switch for issuing a command to accelerate (increase the vehicle speed), a decelerator switch for issuing a command to decelerate (reduce the vehicle speed), and a resume switch for directing a return to constant speed control, allowing the driver to freely set the vehicle speed. Constant speed control is released when predetermined conditions, such as brake pedal operation and vehicle speed that is below a predetermined lower limit, are established. The constant speed control device 10 comprises an output control device 41 for controlling the throttle opening (or the fuel injection amount) of the engine 30 so as to cause the vehicle speed to conform to the set vehicle speed.

Figure 2:
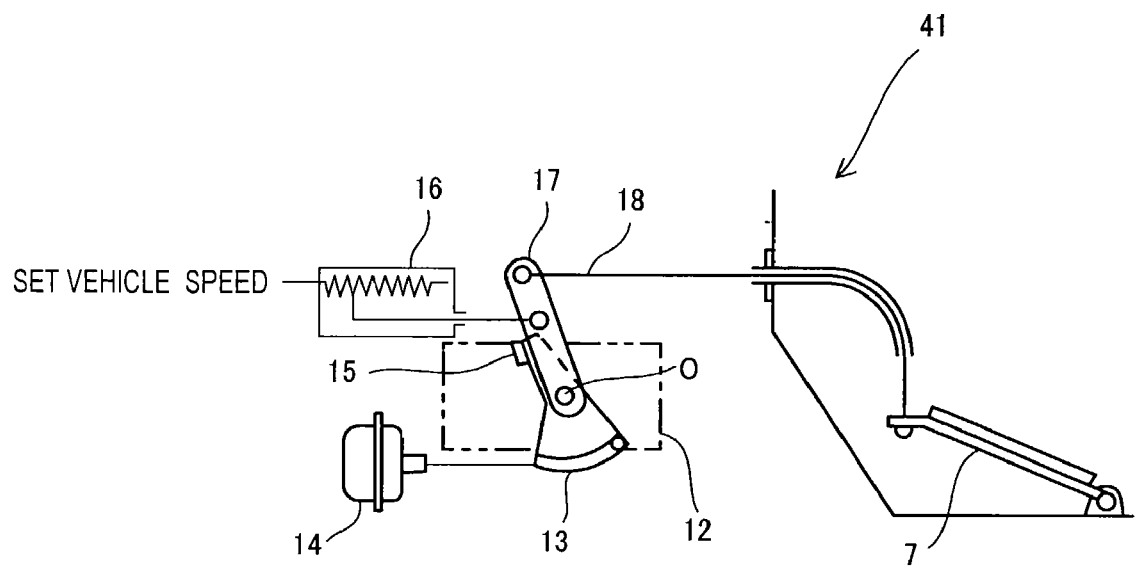
FIG. 2 is a schematic drawing of an output control device for a constant speed control device.

FIG. 2 shows the output control device 41. The movement of the accelerator 7 is transmitted to an output adjustment lever 17 by way of a wire 18, and is transmitted to the output adjustment mechanism 12 such as the throttle of a gasoline engine or the inline pump of a diesel engine. The operation amount of the output adjustment mechanism 12 (the operation amount of the output control device 41) is detected by a sensor 16. According to this configuration, even if a damper (dashpot) is disposed between the output adjustment mechanism 12 and the accelerator 7 in order to reduce the smoke produced by initial acceleration immediately after depressing the accelerator 7, the operation amount of the output adjustment mechanism 12 (the operation amount of the output control device 41) can be correctly detected.

When the constant speed control device 10 is switched on and the target vehicle speed is set, an actuator 14 operates and rotates a drum 13 so as to maintain the set target vehicle speed. The drum 13 rotates around the same axis O as the output adjustment lever 17. When the actuator 14 rotates the drum 13 counterclockwise by way of a wire, the end of a pickup 15 of the drum 13 pushes the output adjustment lever 17, rotates counterclockwise, and increases the output of the engine 30.

When the vehicle speed rises above the set target vehicle speed, the actuator 14 rotates the output adjustment lever 17 clockwise and reduces the output of the engine 30. When the constant speed control device 10 is operating in such a manner, the output adjustment lever 17 holds a required position for maintaining the set target vehicle speed even if the foot is separated from the accelerator 7. The accelerator operation amount is zero if the accelerator 7 is not depressed, but the equivalent value of the accelerator operation amount (the operational state of the output control device 41) can be detected by detecting the operation amount of the output adjustment mechanism 12 using the sensor 16.

Figure 3:
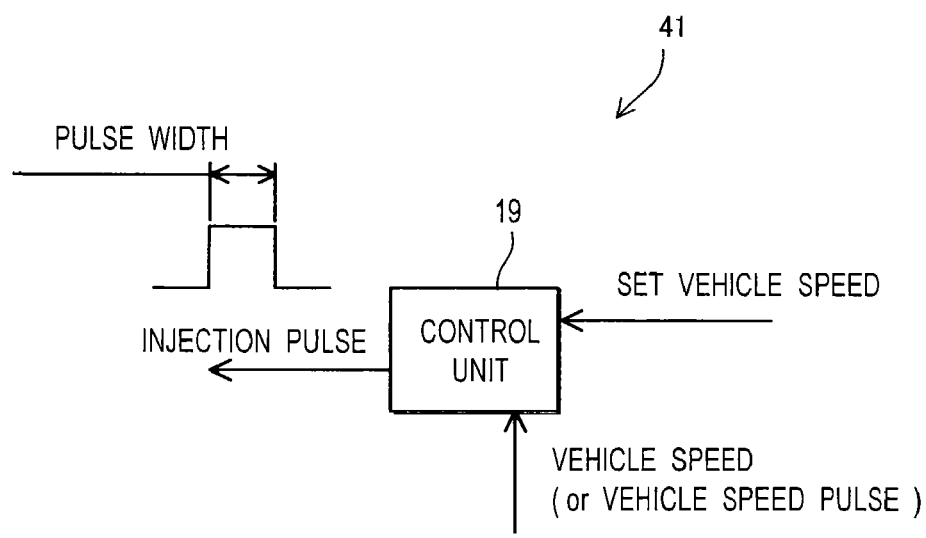
FIG. 3 shows an example of another output control device for the constant speed control device.

The output control device 41 is not limited to one that uses the mechanical actuator 14 as shown in the FIG. 2, and may also control the fuel injection pulse width sent to the fuel injection valve and maintain a constant speed, as shown in FIG. 3. In a control unit 19 of the output control device 41, the current vehicle speed (the actual vehicle speed) and the target vehicle speed are compared when the target vehicle speed is set, and when the actual vehicle speed is lower than the tolerance range of the target value, the fuel injection pulse width is widened, or is conversely narrowed when the actual vehicle speed is greater than the target value, controlling the engine rotational speed so that the set target vehicle speed is maintained. This is a possible constant speed control in diesel engines comprising a common rail fuel injection mechanism, or in gasoline engines comprising an electronic fuel injection valve.

Figure 4:
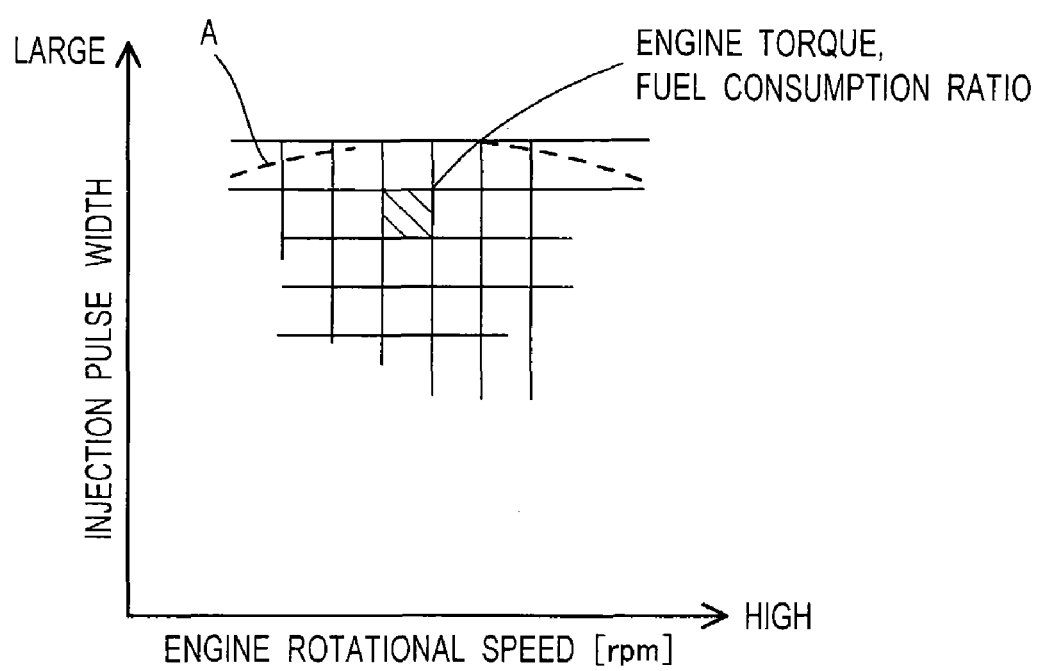
FIG. 4 is an overall engine performance map showing the relationship between the engine torque and the fuel consumption ratio, which corresponds to the injection pulse width and the engine rotational speed.

In this case, an overall performance map showing the relationship between the engine torque and the fuel consumption ratio, which corresponds to the injection pulse width and the engine rotational speed, is prepared as in FIG. 4. The engine torque and the fuel consumption ratio are then read with reference to this map, the engine output is obtained from the engine rotational speed and the torque as described hereinafter, and the fuel consumption is calculated from the engine output and the fuel consumption ratio.

In a common rail diesel engine, there are cases in which efforts are made to decrease the pulse width in a low speed or in a high speed range to avoid the generation of excessive smoke, and the broken line A in FIG. 4 shows such a situation.

While the constant speed control device 10 is not operating, the operation amount of the accelerator 7 is used as the operational state of the output control device 41, and while the constant speed control device 10 is operating, the output of the sensor 16 is used as the operational state of the output control device 41.

The computing unit 3 computes the fuel economy and other operating conditions based on the above-described signals, the vehicle specification data read from the memory card 7, the overall engine performance map, and other computational data. The computed operating conditions are displayed on the display 4 and recorded on the memory card 7 with the memory card reader/writer 5.

Figure 5A:
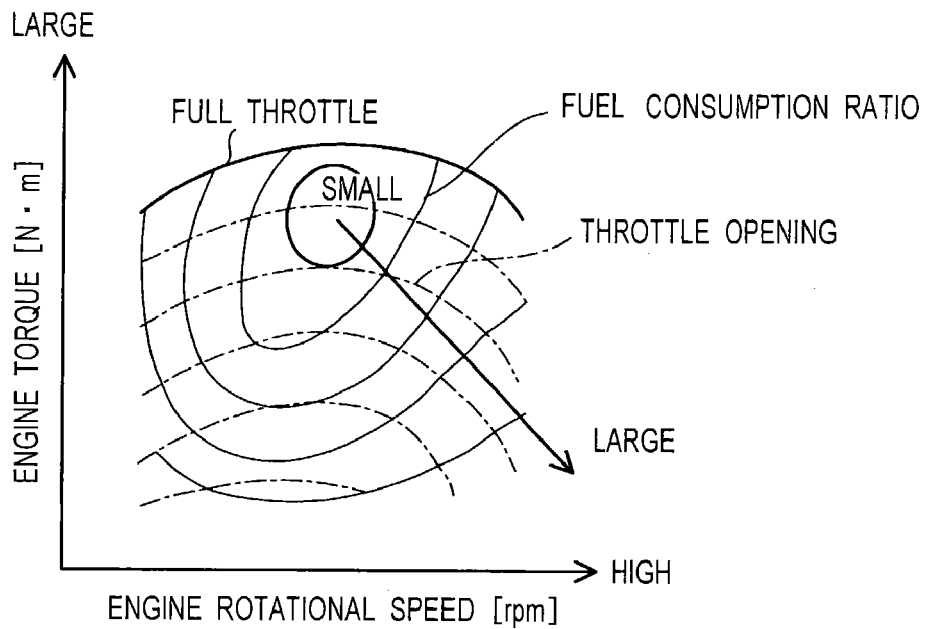
FIGS. 5A and 5B show overall engine performance maps.
Figure 5B:
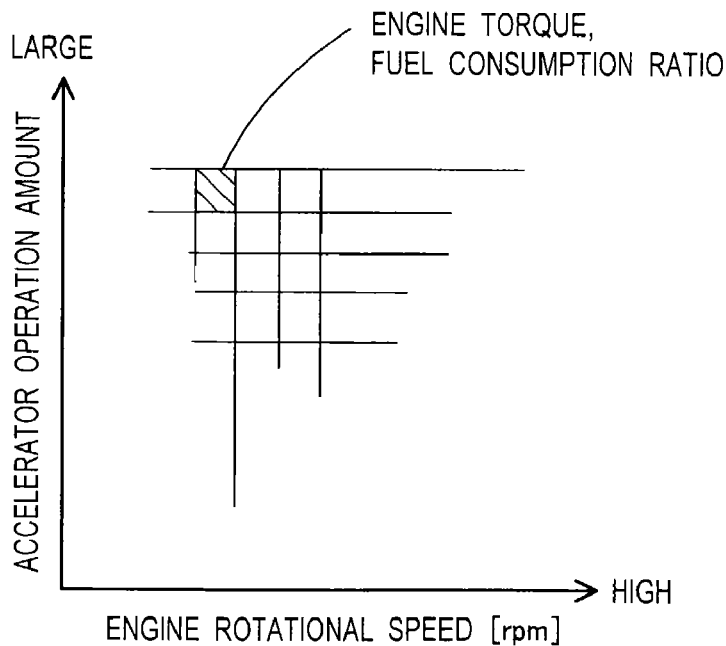

An overall engine performance map is commonly referred to as a map showing the relationship of the fuel consumption ratio (BSFC) versus the engine rotational speed and the engine torque, as shown in FIG. 5A, but handling is inconvenient in this situation in that the engine torque must be computed to obtain the fuel consumption ratio. In view of the above, the accelerator operation amount (or the equivalent value of the accelerator operation amount, or the throttle opening) is rewritten here as the vertical axis, and the engine rotational speed as the horizontal axis, as shown in FIG. 5B; and the rewritten map is used whereby the fuel consumption ratio and the engine torque are stored in separate meshes.

The monitoring computer 2 comprises a vehicle database and monitoring software, and performs transactions with the onboard unit 1 by way of the memory card 7, which is a recording medium capable of reading and writing, for data required in the computation of operating conditions, and for the computation results of the operating conditions recorded when traveling. The monitoring computer 2 is used to automatically generate an overall engine performance map for the vehicle, to record the overall engine performance map and data required to compute the operating conditions to the memory card 7, and to analyze and display data recorded in the memory card 7 with the onboard unit 1.

Figure 6:
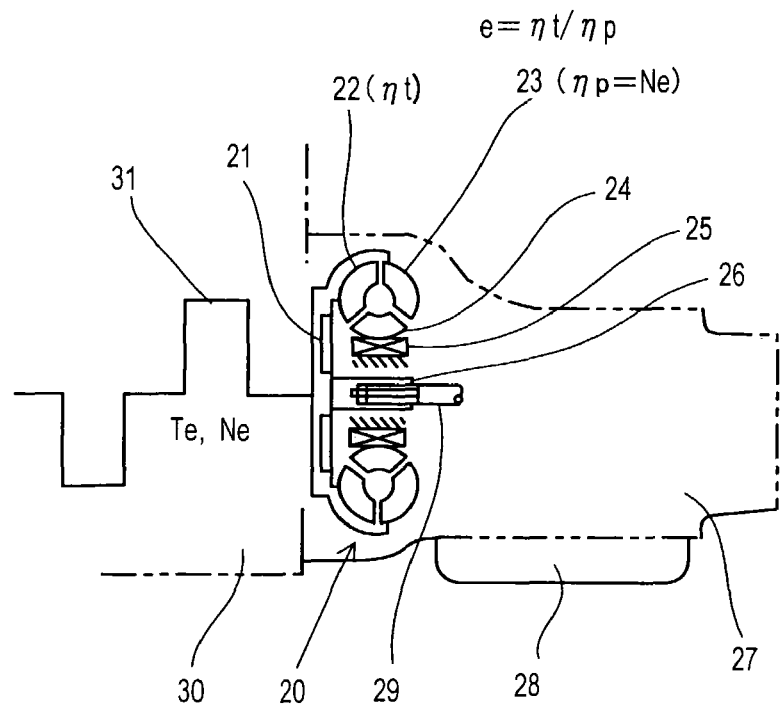
FIG. 6 is a schematic drawing of an automatic transmission with a torque converter.

The automatic transmission 27 with the torque converter 20 is subsequently shown in FIG. 6.

The torque converter 20 comprises a pump impeller 23, a turbine runner 22, and a stator 24. The pump impeller 23 integrally rotates with a crankshaft 31 of the engine 30. Power is transmitted to the turbine runner 22 from the pump impeller 23 by way of a fluid.

The stator 24 changes the direction of the flow of the fluid in the case that the rotational speed of the turbine runner 22 is low in comparison with the pump impeller 23, and increases the torque. The ratio of the rotational speed nt of the turbine runner 22 and the rotational speed np of the pump impeller 23 (equivalent to the engine rotational speed Ne) is the input/output rotational speed ratio e.

When the rotational speed nt of turbine runner 22 is about 0.8 of the rotational speed np of the pump impeller 23 (the input/output rotational speed ratio e is about 0.8), the one-way clutch 25 disengages and the stator 24 begins idle rotation. The increase of the torque due to the torque converter 20 disappears in a region in which the input/output rotational speed ratio e is large subsequently. The rotational speed of the input shaft 29 is the same as that of the turbine runner 22, since the turbine runner 22 is spline-coupled to an input shaft 29 of the automatic transmission 27 by way of an output axle 26.

Figure 7:
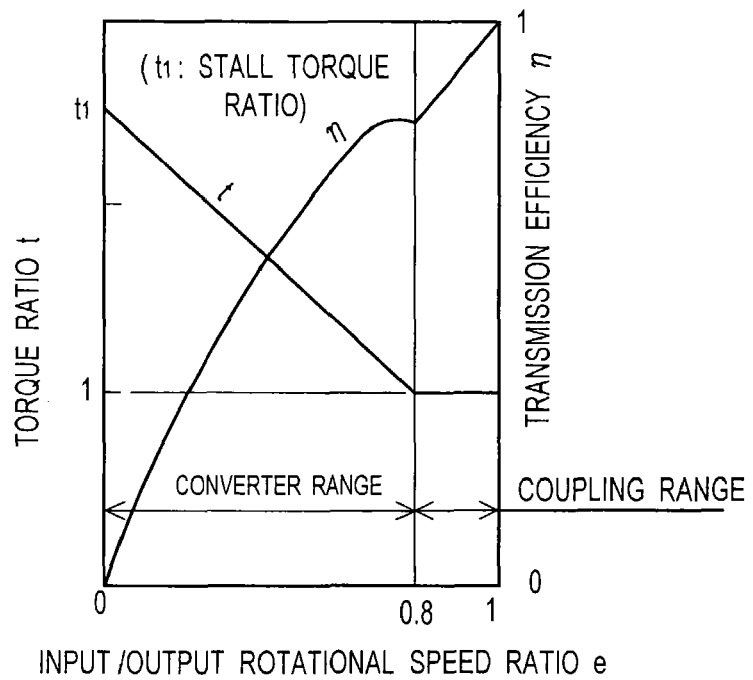
FIG. 7 is a characteristics graph showing the relationship between the transmission efficiency, the torque ratio, and the input/output rotational speed ratio of the torque converter.

The input/output rotational speed ratio e is obtained from the rotational speed of the engine 30 and the rotational speed of the turbine runner 22; the transmission efficiency η is obtained from the characteristic chart of the torque converter created in advance as in FIG. 7; and the fuel amount consumed in excess by the slippage of the torque converter 20 is calculated.

First, the torque and the fuel consumption ratio are obtained from the operating conditions of the output control device 41 and the rotational speed of the engine 30 with reference to the overall engine performance map. The engine output is subsequently calculated from the rotational speed of the engine, and the obtained engine torque and the fuel consumption per unit of time is computed by multiplying this with the fuel consumption ratio. The rotational speed of the turbine runner 22 can be indirectly obtained from the speed ratio corresponding to the gear position and the rotational speed of the driving axle or wheel. The gear position can be determined based on the gear position signal from the control unit in the case of an electronic control automatic transmission, or on the line oil pressure of the control unit in the case of a mechanical automatic transmission.

By multiplying the vehicle speed with the running resistance, the work ratio whereby the vehicle works against resistance is calculated. This is divided by the transmission ratio (0.97, for example) of the section downstream from the transmission, and the work ratio received by the input shaft 29 is obtained. The ratio of the work ratio inputted to the input shaft 29 and the work ratio of the engine is equivalent to the transmission efficiency η of the torque converter 20.

Excessive consumption due to the slippage of the torque converter 20 is equal to (1−η) times the fuel amount consumed by the engine. The transmission efficiency η may be directly obtained from FIG. 7, but the value in this diagram is the designed value or the value in an ideal state. The transmission efficiency η of the torque converter 20 changes due to the temperature and change in characteristics of the oil, and to the deteriorating performance of the torque converter 20. Due to the above, it is more realistic to use a value obtained by calculation.

When the vehicle speed is increased, and the rotational speed Ne of the engine 30 and the rotational speed nt of the turbine runner 22 become equal to each other, it is determined that the lockup clutch 21 has engaged, in other words, a lockup condition has been established, and the input/output rotational speed ratio e and the transmission efficiency η are both calculated to be one.

The specific content of this system is described below.

1. Setting data of the vehicle to be evaluated

When evaluating the operating conditions of a vehicle with this system, the vehicle to be evaluated by the monitoring computer 2 is selected from the vehicle database. Examples of items that are selected include the name of the manufacturer, the model, the year of manufacture, the engine type, the engine rotational speed while idling, the gross mass of the vehicle, the deceleration ratio of the deferential gear unit, the speed ratio of the transmission for each gear position, the type of wind deflector, the body type, and the tire size. The items corresponding to the vehicle to be evaluated are respectively selected.

When the selection is completed, the maximum engine torque, the engine rotational speed at maximum engine torque, the maximum drive force, the minimum fuel consumption ratio, the engine rotational speed at the minimum fuel consumption ratio, and other engine performance data; and the front projected surface area, the air resistance coefficient, and other vehicle body characteristics data, as well as the relationship between the engine rotational speed and the engine rotation pulse, the relationship between the vehicle speed and the vehicle speed pulse, and the like are automatically selected; and the selected data is written to the memory card 7.

Of the data that is selected, the engine performance data and the vehicle body characteristics data can be extracted from catalogues, maintenance manuals, and other documentation distributed by vehicle manufacturers, so there is no need to collect these data by performing actual driving tests when creating the database. The relationship between the engine rotational speed and the engine rotation pulse, and the relationship between the vehicle speed and the vehicle speed pulse can also be acquired from the output signal of the engine control unit mounted in each vehicle.

In order to create the overall engine performance map using the monitoring computer 2, torque pattern verification for the vehicle to be evaluated is performed based on several types of representative torque patterns prepared in advance on the basis of the torque of the vehicle to be evaluated stored in the vehicle database.

The fuel consumption ratio of an engine having a similar torque pattern has substantially the same characteristics regardless of the engine type (engine displacement, and the like), so fuel consumption ratio characteristic data that corresponds to the torque pattern of the vehicle to be evaluated is selected from among the fuel consumption ratio characteristic data which corresponds to the representative torque pattern that is prepared in advance. By then combining this selected fuel consumption ratio characteristic data and minimum fuel consumption ratio, which is the actual value, the fuel consumption ratio of the remaining operating conditions is computed, and the fuel consumption ratio data of the overall engine performance map is generated.

When the engines of vehicles to be evaluated have a similar torque pattern, only one fuel consumption ratio characteristic data need be provided, and verification of the torque pattern is also not required.

Figure 8:
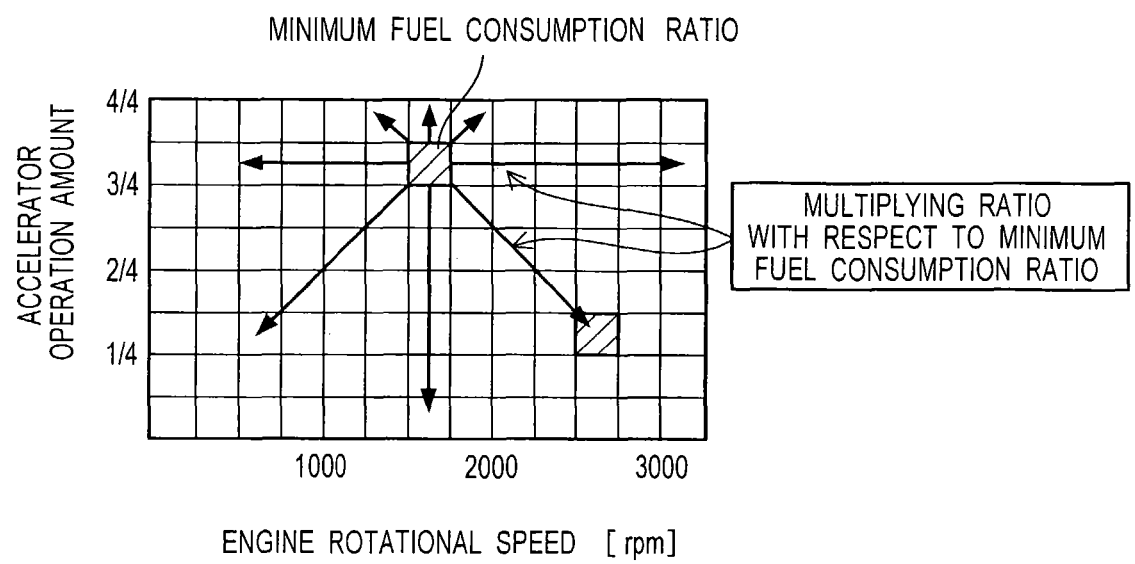
FIG. 8 is a diagram schematically depicting the situation in which the fuel consumption ratio data of the overall performance map of the engine is automatically generated.

FIG. 8 shows the situation in which the fuel consumption ratio data of an overall engine performance map is automatically generated. As described above, if the torque pattern is known, then the fuel consumption ratio characteristic of the engine is known, so if one minimum fuel consumption ratio, which is the actual value, is given, then the fuel consumption ratio for all operating conditions can thereafter be obtained by using the corresponding ratios as multipliers. The torque data of the overall engine performance map can be obtained from the engine output characteristics stored in the database.

Thus, the overall engine performance map comprising the fuel consumption ratio data and the engine torque data is automatically generated, and the generated map is recorded in the memory card 7.

Once the data required to compute the operating conditions is written in the memory card 7, the memory card 7 is inserted into the memory card reader/writer 5 of the onboard unit 1, and the data required to compute the operating conditions is read into the onboard unit 1.

2. Initial Adjustment of the Sensor and Correction of the Overall Engine Performance Map Once the required data has been read, initial adjustment of the accelerator operation amount sensor and the built-in acceleration sensor 6 is performed. The initial adjustment of the accelerator operation amount sensor is performed by detecting the sensor output value of when the accelerator is in a released state and in a fully depressed state, and the initial adjustment of the built-in acceleration sensor 6 is performed using a level attached to the device.

When the initial adjustment of the sensor is completed, the vehicle is subsequently actually run, and the torque data of the above-described overall engine performance map is corrected based on the data measured at that time. The basis for this type of correction is that there is discrepancy between the catalog performance and the actual performance of an engine, and this discrepancy must be corrected in order to compute an accurate operating condition. The correction is performed based on the data measured after the onboard unit 1 has been installed in the vehicle and during the first run.

Specifically, the vehicle is run under first trace conditions (an accelerator operation amount is over 70%) and the torque data during full throttle running is computed; and the vehicle is run under second trace conditions (an accelerator operation amount is 30 to 70%) and the engine rotational speed and the accelerator operation amount at a specified torque are measured. Each of the trace conditions is set by road incline zero, specified value of the water temperature, acceleration state, and the empty vehicle state; and the engine torque Te [N·m] is computed by the following Eq. (1).

$$Te = \frac{R \cdot r}{it \cdot if \cdot \eta_1} \quad (1)$$

R [N] is the running resistance computed using Eqs. (8) to (13) described below, r [m] is the dynamic load radius of the tire, it is the speed ratio of the current gear position, if is the deceleration ratio of the deferential gear unit, and $\eta_1$ is the transmission efficiency after the automatic transmission 27.

The torque converter 20 is installed between the engine 30 and the automatic transmission 27. When the lockup clutch is released, slippage occurs in the torque converter 20 and a discrepancy is created between the computed engine torque and the actual engine torque. In view of the above, the engine torque Te from the above-described Eq. (1) is corrected as follows.

First, the engine torque Te and the torque Te' transmitted to the output shaft 29 of the torque converter 20 have the relationship noted in the following Eq. (2), based on the torque ratio t of the torque converter 20.

$$Te' = Te \cdot t \quad (2)$$

From the characteristic chart of FIG. 7, the transmission efficiency $\eta$ of the torque converter 20 can be expressed as h=e·t, so if the stall torque ratio is $t_1$, the torque ratio t can be obtained from the following Eq. (3).

$$t = t_1 - \left(\frac{(t_1 - 1) \cdot e}{0.8}\right) \quad (0 \leq e < 0.8) \quad (3)$$
$$t = 1 \quad (0.8 \leq e)$$

When e is less than 0.8, the torque converter 20 is in the converter range in which slippage occurs between the pump impeller 23 and the turbine runner 22, and when greater than 0.8, the torque converter 20 is in the coupling range in which the rotational speeds of the pump impeller 23 and the turbine runner 22 match each other.

The work $\Delta Le$ consumed by the slippage of the torque converter 20 is subsequently obtained from the work Le performed by the engine 30 and the work Le' transmitted to the output shaft 29 of the torque converter 20. The work Le' [N·m/sec] transmitted to the output shaft 29 of the torque converter 20 is calculated by the following Eq. (4).

$$Le' = \frac{\pi \cdot Te' \cdot nt}{30} = \frac{\pi}{30} \cdot \frac{R \cdot r}{it \cdot if \cdot \eta_1} \cdot \frac{V \cdot 1000}{2\pi r \cdot 60} \cdot it \cdot if \quad (4)$$
$$= \frac{R \cdot V}{3.6 \cdot \eta_1}$$

nt [rpm] is the rotational speed of the turbine runner 22.

The work Le' transmitted to the output shaft 29 of the torque converter 20 is Le'=$\eta$·Le, so the work Le performed by the engine 30 is expressed by the following Eq. (5).

$$Le = \frac{Le'}{\eta} = \frac{1}{\eta} \cdot \frac{R \cdot V}{3.6 \cdot n_1} \quad (5)$$

The work $\Delta Le$ consumed by the slippage of the torque converter 20 is therefore expressed by the following Eq. (6).

$$\Delta Le = (1 - \eta) \cdot Le = \frac{1 - \eta}{\eta} \cdot \frac{R \cdot V}{3.6 \cdot \eta_1} \quad (6)$$

The torque (TC loss torque) $\Delta Te$ consumed by the slippage of the torque converter 20 is further expressed by the following Eq. (7).

$$2\pi np \cdot \Delta Te = \frac{1 - \eta}{\eta} \cdot \frac{R \cdot V}{3.6 \cdot \eta_1} \quad (7)$$
$$\Delta Te = \frac{1}{2\pi np} \cdot \frac{1 - \eta}{\eta} \cdot \frac{R \cdot V}{3.6 \cdot \eta_1}$$
$$\Delta Te = (1 - \eta) \cdot Te$$

np [rpm] is the rotational speed of the pump impeller 23. The TC loss torque $\Delta Te$ need merely be added to correct the engine torque Te from the above-mentioned Eq. (1).

The torque data for the overall engine performance map is then corrected based on the measured and computed data. By making corrections based on the running data while running with a full load and a partial load, the torque data of the overall engine performance map can be corrected to a substantially accurate value.

The determination as to whether the operating conditions of the torque converter 20 is in the converter range or in the coupling range (including the lockup state) is made as follows: the gear in use is known from the gear position signal obtained from the automatic transmission 27, so the speed ratio corresponding to the gear position is used to obtain the engine rotational speed under the assumption that the range is the coupling range; a comparison is then made with the actual engine rotational speed; and if both match, the range is determined to be the coupling range (or a lockup state).

3. Computation and Determination of the Operating conditions Based on the Running Data.

Once the overall engine performance map having accurate torque data is obtained in the manner described above, the calculation and determination of the operating conditions that will be used in the evaluation are started. More specifically, the basic data is first computed, and the computation and determination of the operating condition are performed using the computation results of this basic data.

3.1 Computation of the Basic Data

The rolling resistance coefficient $\mu r$, the running resistance R, and the drive force F are computed as the basic data that are used in the computation of the operating conditions.

The rolling resistance coefficient $\mu r$ is data that is used when computing the rolling resistance Rr described below, and this coefficient varies according to the road surface condition (dry, rain, dew, snow, or other weather condition), the type of tire, degree of wear, and other conditions. The data that is used in the computation of the rolling resistance coefficient $\mu r$ is measured while the accelerator operation amount is at 0% and the select lever is in the N-range, and the required data that is used in the computation of the rolling resistance coefficient $\mu r$ is measured. The rolling resistance coefficient $\mu r$ is more specifically computed with the following Eq. (8) based on the vehicle speed v1 [m/sec] at the start of deceleration and the vehicle speed v2 [m/sec] after a predetermined length of time $\Delta t$ [sec].

$$\mu r = \frac{1}{g} \cdot \frac{v1 - v2}{\Delta t} \quad (8)$$

In the formula, g is gravitational acceleration (9.8 [m/sec$^2$]). (The same follows for other formulas.)

The gradient resistance Rs [N], the acceleration resistance Ra [N], the air resistance Rl [N], and the rolling resistance Rr [N] are each obtained, and the running resistance R [N] is computed according to the following Eq. (9).

$$R=Rr+Rl+Rs+Ra \quad (9)$$

The gradient angle θ is obtained from the difference between the acceleration that includes the vertical direction detected by the acceleration sensor 6, and the vehicle forward/backward acceleration α that is computed based on the vehicle speed signal; and the gradient resistance Rs is computed with the following Eq. (10).

$$Rs=M \cdot g \cdot \sin \theta \quad (10)$$

M [kg] is the gross mass of the vehicle.

The acceleration resistance Ra is the resistance due to inertial force that operates when the vehicle accelerates or decelerates. The acceleration resistance Ra is computed with the following Eq. (11) based on the mass equivalent of the rotational portion Mr [kg], the gross mass M [kg] of the vehicle, and the vehicle forward/backward acceleration α [m/sec$^2$], which are computed based on the vehicle speed signal $$Ra=\alpha \cdot (M+Mr) \quad (11)$$

The air resistance Rl is the resistance created from the impact of the vehicle with the air while running. The air resistance Rl is computed with the following Eq. (12) based on the air density ρ [kg/m$^3$], the air resistance coefficient Cd, the front projected surface area A [m$^2$], and the vehicle speed V [m/sec].

$$Rl = \frac{1}{2} \cdot \rho \cdot Cd \cdot A \cdot V^2 \quad (12)$$

The rolling resistance Rr is the resistance created between the tire and the road surface. The rolling resistance Rr is computed with the following Eq. (13) based on the gross mass M [kg] of the vehicle and the rolling resistance coefficient ηr.

$$Rr = \mu r \cdot M \cdot g \quad (13)$$

The drive force F [N] is the force that moves the vehicle with the output from the engine 30. The drive force F is computed with the following Eq. (14) based on the engine torque Te [N·m] obtained by referring to the overall engine performance map, the speed ratio it of the currently gear position, the deceleration ratio if of the deferential gear unit, the transmission efficiency $\eta_1$ of the section downstream from the automatic transmission 27, and the dynamic load radius of the tire r [m].

$$F = \frac{Te \cdot it \cdot if \cdot \eta_1}{r} \quad (14)$$

3.2. Computation and Determination of the Operating Conditions

The basic data computed as described above is used to compute and determine the operating conditions. The computation and determination of the operating conditions includes computation of the fuel consumption and fuel economy, computation of the excess drive force and the excess drive force ratio, computation of the excess fuel consumption, determination of idling, determination of rapid acceleration and rapid deceleration, determination of excess speed, determination of the possibility of shifting to a higher gear, determination of constant velocity running, and determination of racing. These computation and determination processes are described below.

(1) Computation of the Fuel Consumption and Fuel Economy

The fuel consumption is computed based on the engine rotational speed Ne [rpm] (=the rotational speed np of the pump impeller 23) and on the engine torque Te [N·m] obtained from the engine rotational speed Ne and accelerator operation amount AOA (or the output of the sensor 16 of the constant speed control device 10) by referring to the overall engine performance map.

Figure 9:
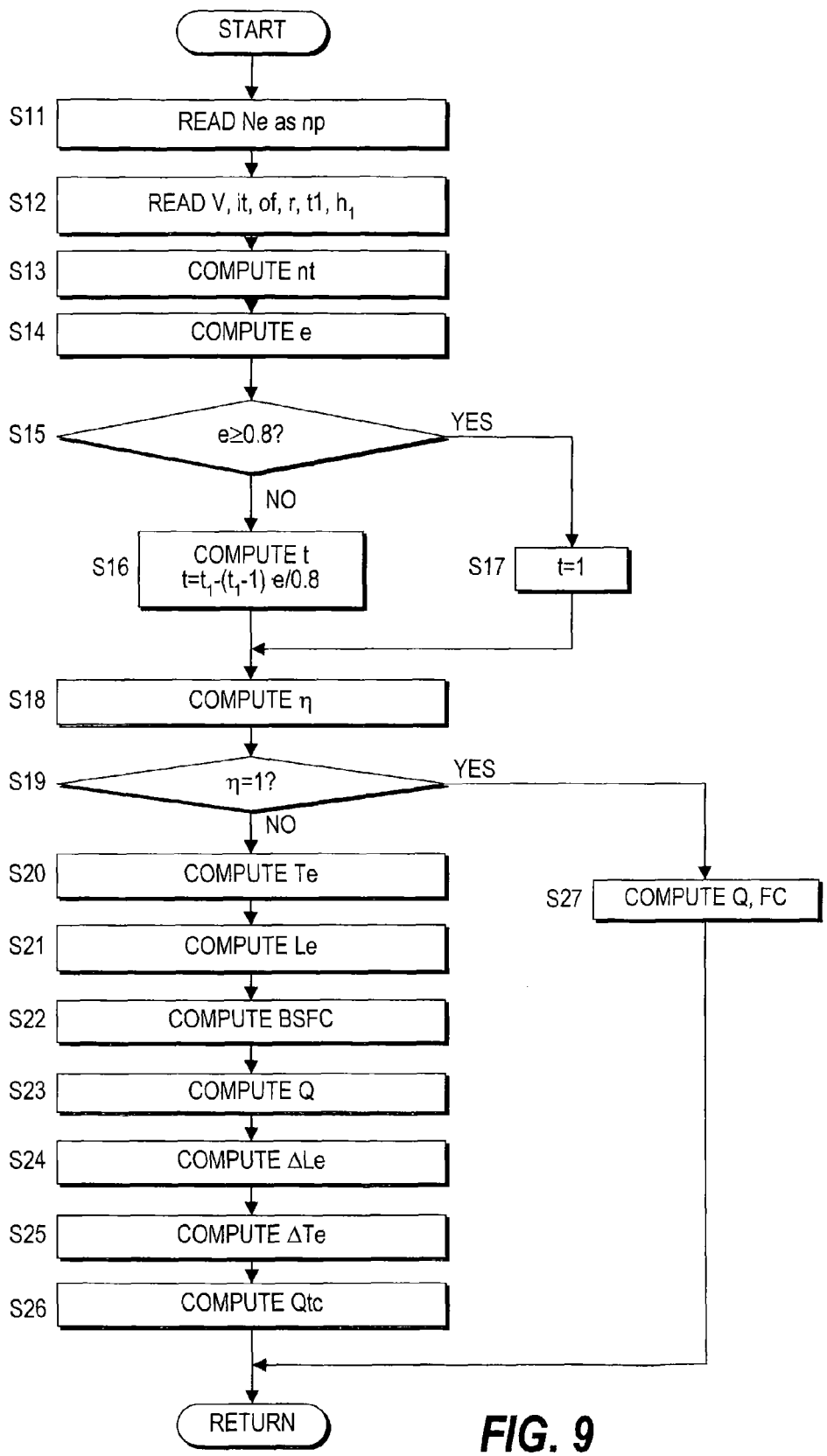
FIG. 9 is a flowchart showing the process for computing the engine torque, the fuel consumption ratio, and the fuel consumption in accordance with the operating conditions of the torque converter.

The calculation of fuel consumption and engine torque in a vehicle provided with the torque converter 20 is described below with reference to the flowchart in FIG. 9.

In step S11, the detected engine rotational speed Ne is read as the rotational speed np of the pump impeller 23 of the torque converter 20.

In step S12, the vehicle speed V [km/hour] inputted to the computing unit 3, the speed ratio it corresponding to the gear position, the deceleration ratio if, the dynamic load radius of the tire r [m], the stall torque ratio t1, and the power transmission efficiency $\eta_1$ after the automatic transmission 27 are read.

In step S13, the rotational speed nt [rpm] of the turbine runner 22 is calculated with the aid of the following formula.

$$nt = \frac{V \cdot it \cdot if \cdot 1000}{2 \cdot \pi \cdot r \cdot 60}$$

In step S14, the input/output rotational speed ratio e of the torque converter 20 is calculated with the aid of the following formula.

$$e = nt/np$$

In step S15, a determination is made as to whether the input/output rotational speed ratio e is in the converter range or not. If the input/output rotational speed ratio e is greater than the predetermined value, then it is determined to be in the coupling range, and the torque ratio t is calculated as 1 in step S17. The predetermined value is set to a speed ratio of 0.8 at the coupling point, for example. If the input/output rotational speed ratio e is less than the predetermined value, then it is determined to be in the converter range, the process advances to step S16, and the torque ratio t is calculated with the aid of the above-mentioned Eq. (3) based on the stall torque ratio $t_1$.

$$t = t_1 - \frac{t_1 - 1}{0.8} \cdot e$$

In step S18, the power transmission efficiency η of the torque converter 20 is calculated with the aid of the following formula.

In step S19, a determination is made as to whether the power transmission efficiency η is 1 or not, and if it is not 1, then the process advances to step S20. If the it is 1, then the process advances to step S27, and the fuel consumption Q and fuel economy FC are computed in the same manner as in the case of a manual transmission.

In step S20, the engine torque Te [N·m] is calculated based on the engine rotational speed Ne and the accelerator operation amount AOA by referring to the overall engine performance map of FIG. 5B. The engine torque Te may alternatively be calculated with the aid of the following Eq. (15).

$$Te = \frac{(Rr + Rl + Rs + Ra) \cdot r}{t \cdot it \cdot if \cdot \eta_1} \tag{15}$$

In step S21, the work Le [kW] performed by the engine 30 in unit time is calculated with the aid of the following Eq. (16).

$$Le = \frac{2\pi \cdot Te \cdot np}{60 \cdot 1000} \tag{16}$$

In step S22, the fuel consumption ratio BSFC [g/kW·h] is calculated based on the engine rotational speed Ne and the accelerator operation amount AOA by referring to the overall engine performance map of FIG. 5B.

The fuel consumption Q [l] is calculated in step S23 with the following Eq. (17) based on the work Le, running time h and the density ρ of the fuel.

$$Q = \frac{Le \cdot BSFC \cdot h}{\rho} \tag{17}$$

In step S24, the work ΔLe consumed by the slippage of the torque converter 20 is calculated from the above-mentioned Eq. (6), and in step S25, the TC loss torque ΔTe consumed by the slippage of the torque converter 20 is calculated from the above-mentioned Eq. (7).

In step S26, the fuel consumption Qtc [l] (TC fuel consumption) consumed by the slippage of the torque converter 20 is calculated with the aid of the following formula from the running time h, the fuel consumption ratio BSFC, and the work ΔLe consumed by the slippage of the torque converter 20.

$$Qtc = \frac{\Delta Le \cdot BSFC \cdot h}{\rho} \tag{18}$$

Adopting the above process allows the fuel consumption consumed by the slippage of the torque converter 20 to be calculated.

When the constant speed control device 10 is operating, the output of the sensor 16 is converted to the accelerator operation amount, and the fuel consumption ratio BSFC and the engine torque Te is computed based on this converted value and the engine rotational speed by referring to the map in FIG. 5B. An overall performance map with the output of the sensor 16 serving as the vertical axis in FIG. 5B may alternatively be prepared, and the fuel consumption ratio BSFC and the engine torque Te may be computed with reference to this separately prepared map while the constant speed control device 10 is operating.

In step S27, on the other hand, the engine output Pe [kW] is obtained with the following Eq. (19) on the basis of the engine rotational speed Ne [rpm] and the engine torque Te [N·m] obtained from the engine rotational speed and the accelerator operation amount AOA by referring to the overall engine performance map of FIG. 5A.

$$pE = \frac{\pi \cdot Te \cdot N}{30} \cdot \frac{1}{1000} \tag{19}$$

The fuel consumption Q [l] is computed with the following Eq. (20) on the basis of the engine output Pe, the fuel consumption ratio BSFC [g/kW·hour] obtained based on the engine rotational speed Ne and the accelerator operation amount AOA with reference to the overall engine performance map, the fuel density ρ [kg/l], and the running time h [hour].

$$Q = \frac{BSFC \cdot Pe \cdot h}{\rho \cdot 1000} \tag{20}$$

In step S28, the fuel economy FC is computed and displayed on the display 4. The fuel economy FC [km/l] is computed with the following Eq. (21) on the basis of the fuel consumption Q [l] and the running distance D [km] obtained by integrating the vehicle speed V [km/hour] obtained based on the vehicle speed signal.

$$FC = \frac{D}{Q} \tag{21}$$

The mean fuel economy over a past predetermined length of time, or the current instantaneous fuel economy may, for example, be computed as the fuel economy. When a comparison is made with past fuel economy data and the optimal value of the mean fuel economy is taken, that value is recorded as the best fuel economy.

(2) Computation of the excess drive force and the excess drive force ratio.

The excess drive force Fex is the value that results from subtracting the running resistance R (the value excluding the acceleration resistance Ra) from the drive force F transmitted from the engine 30. If the excess drive force Fex is negative, then the vehicle is decelerating, and if positive, the vehicle is accelerating. If the excess drive force Fex is extremely great, then unnecessary drive force is being expended, and it can be determined that a shift lever operation is required immediately, or that operation is required to return the accelerator operation to an appropriate amount.

Figure 10:
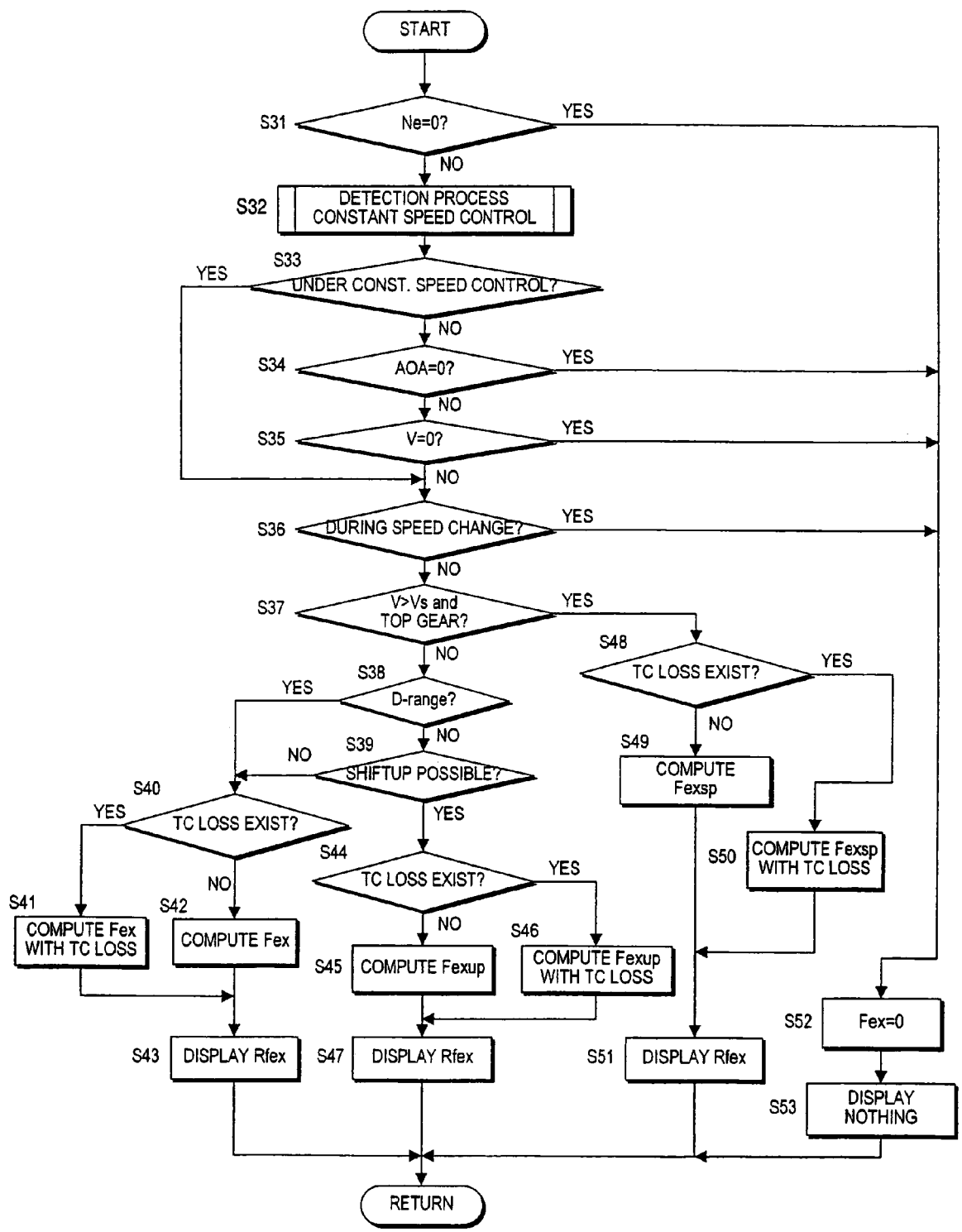
FIG. 10 is a flowchart showing the computing process for excess drive force, the computed excess drive force ratio, and the displaying process for the excess drive force ratio.

FIG. 10 shows the computing process for the excess drive force and excess drive force ratio, and also shows process specifics for displaying the computed excess drive force ratio on the display 4. This processing is repeatedly executed in predetermined time intervals by the computing unit 3.

In step S31, a determination is first made an to whether the engine rotational speed Ne is zero or not. If the engine rotational speed Ne is not zero, then the process advances to steps S32 and S33, and a determination is made as to whether the constant speed control device 10 is operating or not. If the engine rotational speed Ne is not zero, then the process advances to steps S52 and S53, the excess drive force Fex is set to zero, and the operating conditions are not displayed on the display 4.

Figure 11:
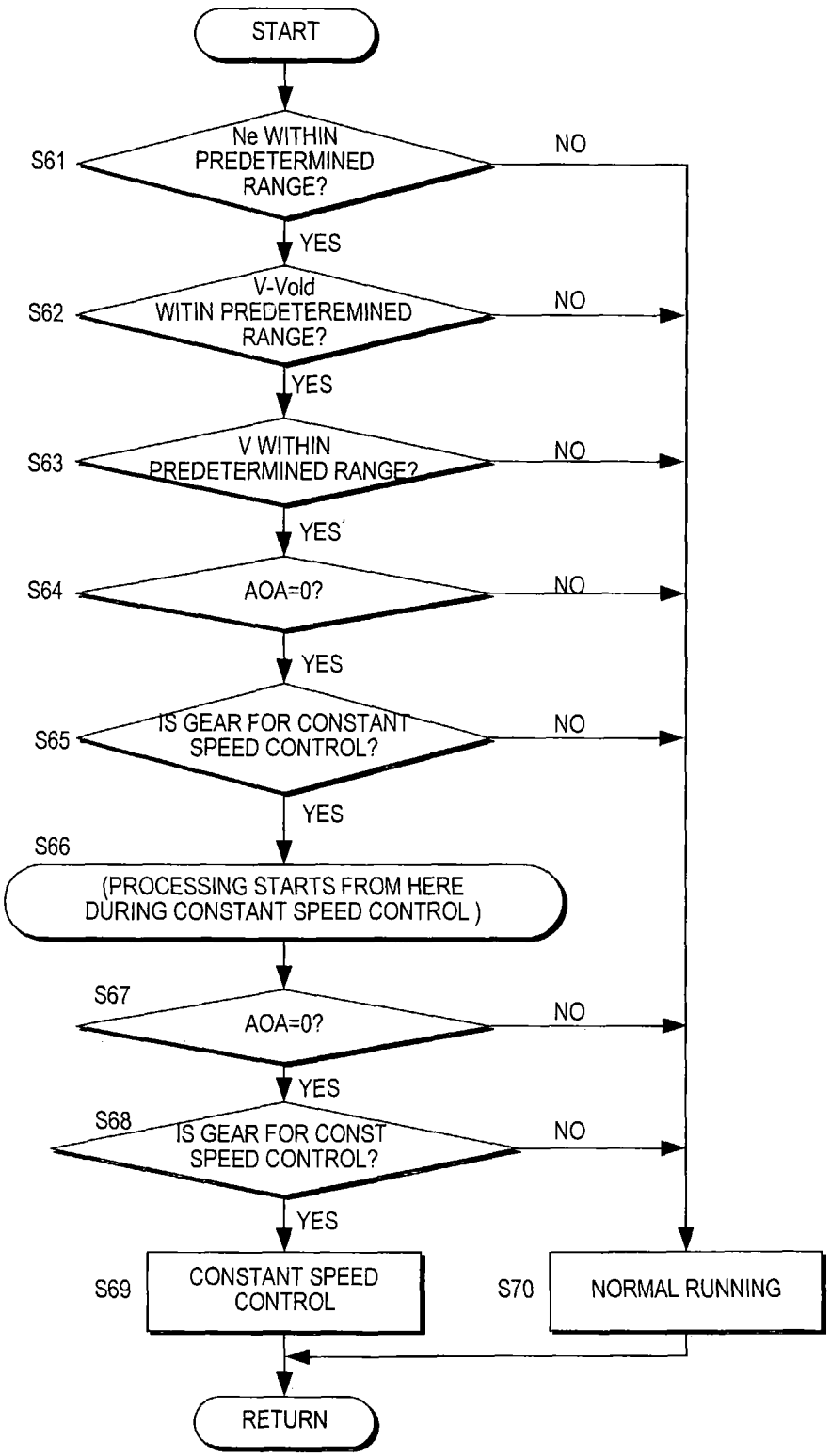
FIG. 11 is a flowchart showing the decision process for constant speed control.

In step S32, the detection process for constant speed control shown in FIG. 11 is executed. In the detection process for constant speed control, the determination as to whether the constant speed control device 10 is operating or not is made from the running condition of the vehicle.

In step S61, a determination is first made as to whether the engine rotational speed Ne is within a predetermined range. If not within the predetermined range, then the process advances to step S70, and a determination of normal running (the constant speed control device 10 is not operating) is made. If within the predetermined range, then the process advances to step S62, a determination is made as to whether the fluctuation of the vehicle speed V is within a predetermined range (10 [km/hour], for example) or not, and if the fluctuation of vehicle speed V is not within the predetermined range, then the process advances to step S70, and a determination of normal running is made. If the fluctuation of the vehicle speed V is not within the predetermined range, then the process advances to step S63. The fluctuation of the vehicle speed V is the difference between the current vehicle speed V and the vehicle speed Vold a predetermined number of cycles prior. If the process in FIG. 10 were to be executed once every 100 [msec], for example, the fluctuation of the vehicle speed V would be the difference between the current vehicle speed V and the vehicle speed Vold from 20 cycles prior (two seconds prior).

In step S63, a determination is made as to whether the current vehicle speed V is within a range settable by the constant speed control device 10. If within the predetermined range (35 [km/hour] to 90 [km/hour], for example) of the vehicle speed V, the process advances to step S64. If not, then the constant speed control is not being executed, so the process advances to step S70 and normal running is determined.

In step S64, a determination is made as to whether the accelerator operation amount AOA is zero or not. If the accelerator operation amount AOA is not zero, then the gas pedal is depressed, so the process advances to step S70 and normal running is determined. If the accelerator operation amount AOA is zero, then the process advances to step S66.

In step S65, a determination is made as to whether the gear is one used during constant speed control; if the gear is one used during the constant speed control, then the process advances to step S66; and if not, then the process advances to step S70 and normal running is determined.

Step S66 is a position in which a subroutine is started if the vehicle is under constant speed control.

In step S67, a determination is made as to whether the accelerator operation amount AOA is zero or not. If the accelerator operation amount AOA is not zero, then the accelerator is depressed, so the process advances to step S70 and normal running is determined. If, however, the accelerator operation amount AOA is zero, then the process advances to step S68; a determination is made as to whether the gear is one used during the constant speed control; and if the gear is one used during the constant speed control, then the process advances to step S69 and constant speed control is determined. If not, then the process advances to step S70 and normal running is determined.

The steps S61 to S70 are processed, the operating state of the constant speed control device 10 is indirectly detected based on the operating conditions of the vehicle, and the process thereafter returns to the flowchart in FIG. 10.

In step S33 of FIG. 10, a determination is made as to whether the vehicle is under constant speed control on the basis of the detection results in step S32. If the vehicle is under constant speed control, then the process advances to step S36. If the vehicle is under normal running, then the process advances to step S34.

In steps S34 and S35, a determination is made as to whether the accelerator operation amount AOA and the vehicle speed V are respectively zero or not. If either the accelerator operation amount AOA or the vehicle speed V are not zero, then the process advances to steps S52 and S53 and the excess drive force Fex is set to zero. In this case, nothing is displayed on the display 4.

In step S36, a determination is made as to whether the gear is currently being changed; in other words, whether the gear position signal from the automatic transmission 27 has changed from the time of the previous execution. If it is determined that the gear is currently being changed, the process advances to steps S52 and S53, the excess drive force Fex is set to zero, and nothing is displayed on the display 4.

If it is determined that the gear is not currently being changed, then the process advances to step S37, and a determination is made as to whether the current vehicle speed V is greater than a specified vehicle speed Vs, and whether the gear position is in the top gear (5th gear in the case of a transmission with five forward gears). The specified vehicle speed Vs is set to 50 [km/hour] for running on ordinary roads, and 80 [km/hour] for running on expressways, for example. When the vehicle speed is greater than the specified vehicle speed Vs and the gear position is in the top gear, the process advances to step S48, and the excess drive force Fex due to excess speed is computed in accordance with the existence of TC loss torque consumed by the slippage of the torque converter 20.

In step S48, the TC loss torque ΔTe consumed by the slippage of the torque converter 20 is calculated from the above-mentioned Eq. (7); and if the TC loss torque ΔTe is zero, then the process advances to step S49, and the excess drive force Fex during excess speed is computed.

In step S49, the air resistance Ra at the current vehicle speed V and the air resistance Ras at the specified vehicle speed Vs are respectively calculated, and the difference between the two is calculated as the excess air resistance Raex. The result of adding the excess air resistance Raex to the excess drive force Fex that is obtained by subtracting the running resistance R, which excludes acceleration resistance, from the drive force F is calculated as the excess drive force Fex due to excess speed. Once the excess drive force Fex due to excess speed is computed, the process advances to step S51; and the excess drive force ratio Rfex [%] is computed with the following Eq. (22) and displayed on the display 4.

$$Rfex = \frac{Fex}{Fmax} \cdot 100 \qquad (22)$$

Fmax is the maximum drive force. However, when the vehicle is running at a constant speed and the ratio [%] corresponding to the current drive force F of the excess air resistance Raex is greater than the excess drive force ratio Rfex, then this ratio is displayed on the display 4 in lieu of the above-described excess drive force ratio Rfex.

When, however, the torque ΔTe consumed by the slippage of the torque converter 20 is not zero in step S48, the process advances to step S50, the result of adding the drive force value corresponding to the torque ΔTe to the excess drive force Fex obtained in step S49 serves as the excess drive force Fex of excess speed, the process advances to step S51, and the excess drive force ratio Rfex is computed and displayed on the display 4.

In step S37, when the vehicle speed V is less than the specified vehicle speed Vs, or when the gear position is not the top gear, the process advances to step S38, and a determination is made as to whether the select lever is in the D-range or not. If the D-range is determined, then the process advances to step S40, and the excess drive force Fex is computed in accordance with the existence of the torque ΔTe consumed by the slippage of the torque converter 20.

In step S40, the torque ΔTe consumed by the slippage of the torque converter 20 is obtained in the same manner as in step S48; and when ΔTe is zero the process advances to step S42, the running resistance R, which excludes acceleration resistance, is subtracted from the current drive force F, and the excess drive force Fex is computed.

When, however, the torque ΔTe is not zero, the process advances to step S41, and the result of adding the drive force corresponding to the torque ΔTe to the value obtained by subtracting the running resistance R, which excludes acceleration resistance, from the current drive force F is computed as the excess drive force Fex. The excess drive force ratio Rfex is computed with the above-mentioned Eq. (22) in step S43 and displayed on the display 4.

If it is determined in step S38 that the select lever is not in the D-range, the process advances to step S39, and a determination is made as to whether a shift to a higher gear is possible by moving the select lever to the D-range. The determination of whether a shift to a higher gear is possible is made as follows.

The engine rotational speed Neup is obtained assuming that a shift to a higher gear was performed by moving the select lever to the D-range, and the engine torque Teupmax at full load when shifting to a higher gear is obtained from the engine rotational speed Neup at this time with reference to the overall performance map. The drive force Fupmax at full load when shifting to a higher gear (maximum drive force) is then calculated based on the engine torque Teupmax at full load. If the engine rotational speed Neup after shifting to a higher gear is greater than the specified rotational speed, and the maximum drive force Fupmax when shifting to a higher gear is greater than the running resistance R (=Rs+Rl+Rr), it is determined that a shift to a higher gear is possible, and if not, then it is determined that a shift to a higher gear is not possible.

If shifting to a higher gear is not possible, then the process advances to step S40, and if shifting to a higher gear is possible, then the process advances to step S44. The excess drive force Fex due to inappropriate select lever operation in accordance with the existence of torque ΔTe consumed by the torque converter 20 is computed in step S44.

In step S44, the TC loss torque ΔTe consumed by the slippage of the torque converter 20 is obtained in the same manner as in steps S40 and S48; when the TC loss torque ΔTe is zero, the process advances to step S45; and when the TC loss torque ΔTe is not zero, the process advances to step S46.

In step S45, the excess fuel consumption Qexup due to inappropriate select lever operation is obtained by subtracting the fuel consumption Qup (the method of calculation is described below), which is expected to occur as a result of shifting to a higher gear, from the current fuel consumption Q. The excess fuel consumption Qexup due to inappropriate select lever operation is then converted to drive force, and the excess drive force Fex due to inappropriate select lever operation is computed. The conversion to drive force is performed by converting the excess fuel consumption to torque with the aid of a relational expression between the engine torque and the fuel consumption derived from Eqs. (19) and (20), and by further substituting this into Eq. (18).

By adopting the above approach, the excess drive force Fex can be computed when running in 2-range or L-range although it is possible to shift to a higher gear once the select lever is moved to the D-range and is run in the D-range.

In step S46, on the other hand, the excess drive force Fex due to inappropriate select lever operation is obtained in the same manner as that in step S45; and the excess drive force Fex due to inappropriate select lever operation is obtained by adding to this the converted value of the drive force of the TC loss torque ΔTe consumed by the slippage of the torque converter 20. By adopting this approach, the excess drive force Fex can be computed when running in the D-range, the 2-range, or other range, and there is no lock up although it is possible to shift to a higher gear once the select lever is operated and run in the D-range.

In step S47, the excess drive force Fex due to inappropriate select lever operation obtained in step S45 or step S46 and the maximum drive force Fmax when shifting to a higher gear are substituted into the above-mentioned Eq. (22), and the excess drive force ratio Rfex is computed and displayed on the display 4.

However, when the vehicle is running at a constant speed and the ratio [%] of the current drive force F to the excess drive force Fex due to inappropriate select lever operation is greater than the excess drive force ratio Rfex, this ratio is displayed on the display 4 in lieu of the excess drive force ratio Rfex.

(3) Computation of the Excess Fuel Consumption

The excess fuel consumption Qex is the fuel amount consumed in excess by operation that worsens fuel economy, and is obtained as the difference between the actual consumption and the fuel consumption for a case in which it is assumed that no operation that may worsen fuel economy has been performed. The excess fuel consumption Qex allows the fuel amount consumed in excess, in other words, the fuel amount that can be saved by improving driving skills, to be known.

The excess fuel consumption Qex is computed as the sum of the excess fuel consumption Qexf due to the use of excess drive force, the excess fuel consumption Qexsp due to excess speed, the excess fuel consumption Qexup due to inappropriate select lever operation, the excess fuel consumption Qexrc due to racing, and the excess fuel consumption Qexidl due to idling.

The excess fuel consumption Qexf due to the use of excess drive force is the fuel amount consumed in excess by using the excess drive force Fex described above, and is calculated based on the excess drive force Fex. When the torque ratio t of the torque converter 20 is less than 1, then the above-mentioned Eq. (7) is used, and when the torque ratio t of the torque converter 20 is 1, then the excess torque Tex [N·m] is obtained from the excess drive force Fex with the aid of the following Eq. (23).

$$Tex = \frac{Fex \cdot r}{it \cdot if \cdot \eta_1} \tag{23}$$

In the formula, r [m] is the dynamic load radius of the tire, it is the speed ratio of the current gear position, if is the deceleration ratio of the deferential gear unit, and $\eta_1$ is the transmission efficiency of the section downstream from the automatic transmission 27.

When the torque ratio t is 1, the excess output Pex is calculated from the excess torque Tex with the aid of the following Eq. (24), and when the torque ratio t is less than 1, the excess output Pex is calculated with the aid of the above-mentioned Eq. (6).

$$Pex = \frac{\pi \cdot Tex \cdot Ne}{30 \cdot 1000} \quad (24)$$

The excess fuel consumption Qexf due to the use of excess drive force is computed from this excess output Pex with the aid of the following Eq. (25).

$$Qexf = \frac{Pex \cdot BSFC \cdot h}{\rho \cdot 1000} \quad (25)$$

The result of totaling the excess fuel consumption Qexf due to the use of excess drive force is recorded in the memory card 7.

The excess fuel consumption Qexsp due to excess speed is the fuel amount consumed in excess as a result of increased air resistance due to running at a vehicle speed faster than the specified vehicle speed Vs. The specified vehicle speed Vs is set to 50 [km/hour] for running on ordinary roads, and 80 [km/hour] for running on expressways, for example. The excess fuel consumption Qexsp due to excess speed is calculated from the difference between the fuel consumption Q at the time of excess speed and the fuel consumption Qs expected at the time of specified vehicle speed.

More specifically, the drive force Fs at the time of specified vehicle speed, excluding the increased portion of air resistance due to excess speed (=the current air resistance Rl—the specified vehicle speed air resistance Rls) from the current air resistance Rl, is first calculated with the aid of the following Eq. (26), with the running resistance R (=Rr+Rs+Ra) serving as the same condition.

$$F = \frac{Ne \cdot it \cdot if \cdot \eta_1}{r} = Rr + Rl + Rs + Ra \quad (26)$$

From this drive force Fs at the time of specified vehicle speed, the engine torque Tes at the time of specified vehicle speed is obtained with the aid of the above-mention Eq. (15) when the torque ratio t of the torque converter 20 is less than 1, and when the torque ratio t of the torque converter 20 is 1, the engine torque Tes [N·m] at the time of specified vehicle speed is obtained with the aid of the following Eq. (27).

$$Ts = \frac{Fs \cdot r}{it \cdot if \cdot \eta_1} \quad (27)$$

The engine rotational speed Nes [rpm] at the time of specified vehicle speed Vs is further obtained from the following Eq. (28).

$$Nes = \frac{Vs \cdot it \cdot if \cdot 1000}{2\pi r \cdot 60} \quad (28)$$

The fuel consumption ratio BSFC [g/kW·h] corresponding to this engine rotational speed Nes [rpm] at the time of specified vehicle speed and the engine torque is calculated with reference to the overall engine performance map, and the engine output Pes [kW] at the time of specified vehicle speed is further obtained with the aid of the following Eq. (29) on the basis of the engine torque Tes [N·m] at the time of specified vehicle speed.

$$Pes = \frac{\pi \cdot Tes \cdot Nes}{30 \cdot 1000} \quad (29)$$

The fuel consumption Qs [l] at the time of specified vehicle speed is then obtained with the aid of the following Eq. (30), and the excess fuel consumption Qexsp due to excess speed is calculated by subtracting the fuel consumption Qs at the time of specified vehicle speed from the current fuel consumption Q.

$$Qs = \frac{Pes \cdot BSFC \cdot h}{\rho \cdot 1000} \quad (30)$$

The result of totaling the computed excess fuel consumption Qexsp at the time of excess speed is recorded in the memory card 7.

The excess fuel consumption Qexup due to inappropriate select lever operation is the fuel amount consumed in excess when the operation points of the engine 30 fall outside the acceptable region of fuel consumption ratios due to the driver neglecting to operate the select lever and running in the L-range or 2-range in spite of being under operating conditions which allow a shift to a higher gear by moving the select lever to the D-range.

The excess fuel consumption Qexup due to inappropriate select lever operation is calculated from the difference between the current fuel consumption Q and the fuel consumption Qup expected by moving the select lever to the D-range and shifting to a higher gear. More specifically, the engine torque Teup [N·m] after shifting to a higher gear is obtained from the following Eq. (31).

$$Teup = Te \times \frac{it}{itup} \times \frac{\eta_1}{\eta_1 up} \quad (31)$$

In the formula, it is the current speed ratio, itup is the speed ratio after shifting to a higher gear, $\eta_1$ is the current transmission efficiency, and $\eta_1$up is the transmission efficiency after shifting to a higher gear.

The engine output Peup [kW] after shifting to a higher gear is obtained with the aid of the following Eq. (32).

$$Peup = \frac{\pi \cdot Teup \cdot Neup}{30 \cdot 1000} \quad (32)$$

The fuel consumption ratio BSFC [g/kW·hour] corresponding to the engine torque Teup and the engine rotational speed Neup after shifting to a higher gear is calculated with reference to the overall engine performance map, and the expected fuel consumption Qup after shifting to a higher gear is then calculated with the aid of the following Eq. (33).

$$Qup = \frac{Peup \cdot BSFC \cdot h}{\rho \cdot 1000} \quad (33)$$

h [hour] is a running time of the vehicle. The excess fuel consumption Qexup due to inappropriate select lever operation is obtained by subtracting this value from the current fuel consumption Q, and the result of totaling this is recorded in the memory card 7.

The excess fuel consumption Qexrc due to racing is the fuel amount consumed in excess by racing when the vehicle is stopped. The excess fuel consumption Qexrc due to racing is obtained by first obtaining the output Peidl during idling with the aid of the following Eq. (34).

$$Peidl = \frac{\pi \cdot Teind \cdot Ne}{30 \cdot 1000} \quad (34)$$

Teind is the indicated torque required to rotate the engine itself against the friction in the main movement system, valve operating system, auxiliary equipment, and the like.

The output Peidl during idling is substituted into the following Eq. (35), and the fuel consumption Qidl during idling is calculated.

$$Qidl = \frac{Peidl \cdot BSFC \cdot h}{\rho \cdot 1000} \quad (35)$$

h [hour] is a running time of the vehicle. BSFC is a fuel consumption ratio during idling. The excess fuel consumption Qexrc due to racing is then calculated by subtracting this fuel consumption Qidl during idling from the current fuel consumption Q, and the result of totaling this is recorded in the memory card 7.

The excess fuel consumption Qexidl during idling is the fuel amount consumed by idling for a predetermined length of time (20 seconds, for example) or longer, and the fuel consumption Q when the idling conditions are established is directly designated as the excess fuel consumption Qexidl. The result of totaling this is recorded in the memory card 7.

The result of adding the excess fuel consumption Qexf due to using excess drive force, the excess fuel consumption Qexsp due to excess speed, the excess fuel consumption Qexup due to inappropriate select lever operation, the excess fuel consumption Qexrc due to racing, and the excess fuel consumption Qexidl due to idling, which were calculated as described above, constitute the excess fuel consumption Qex; and the excess fuel consumption Qex is displayed in the operating conditions display area 43 of the display 4, which is described below.

As shown below, the excess fuel consumption Qex may be obtained by obtaining the fuel amount consumed when an ideal driving is performed specified from the overall engine performance map, and subtracting this ideal fuel consumption from the actual fuel consumption.

Figure 12:
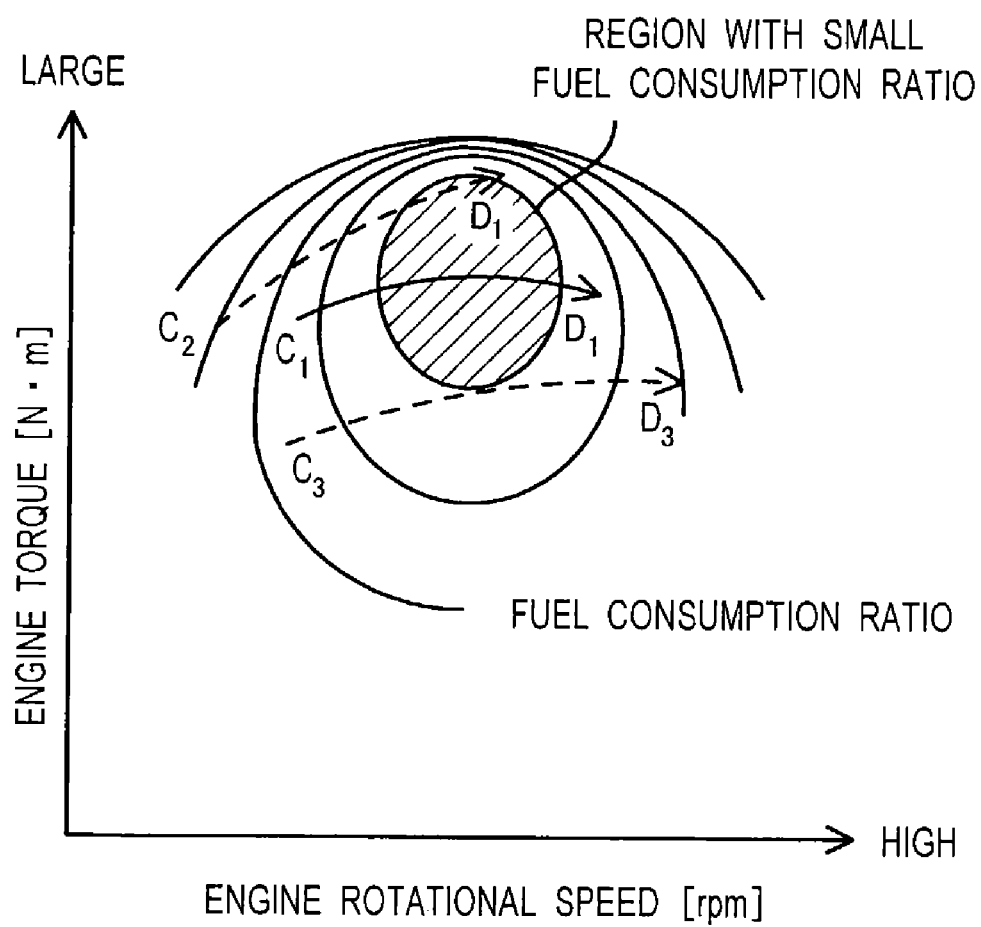
FIG. 12 is a characteristics graph showing the relationship of fuel consumption versus the engine rotational speed and engine torque.

FIG. 12 shows an example of an overall engine performance map, and ideal driving is driving that performs speed change so as to pass through a region shown by the shaded area in the diagram wherein the engine operation points achieve a high fuel consumption ratio. In FIG. 12, if the operational points of the engine move from $C_1$ to $D_1$ in each gear, then the region with a small fuel consumption ratio can be used effectively. If the gear position that is used is inappropriate, and operation is performed so as to move from $C_2$ to $D_2$, or $C_3$ to $D_3$, fuel is excessively consumed even when the same work is performed. The rotational speed is higher and the acceleration time is longer to the degree that torque is not produced on the line $C_3$ to $D_3$.

Ideal operation is therefore operation whereby the operational points of the engine take the path from $C_1$ to $D_1$ in 3rd gear and then shift to a higher gear; the operational points of the engine again take the path from $C_1$ to $D_1$ in 4th gear and then shift to a higher gear again; and the operational points of the engine take the path from $C_1$ to the target vehicle speed. In a vehicle with an automatic transmission, the accelerator operation amount is adjusted so as to achieve the operational points described above, because the gears are determined by the control device of the automatic transmission in accordance with the vehicle speed and the accelerator operation amount.

In order to compute the actual fuel consumption mount, the combination of the engine rotational speed and the torque in a certain interval of running is recorded, and the gear that was used is also recorded. On this basis, the fuel consumption q [l/hour] per hour is computed with the aid of the following Eq. (36):

$$q = BSFC \cdot \frac{\pi \cdot Te \cdot N}{30} \cdot \frac{1}{\rho} \cdot \frac{1}{10^6} \quad (36)$$

and the fuel consumption can be obtained by integrating q with respect to time. ρ[kg/l] is density of the fuel.

In order to compute the ideal fuel consumption, on the other hand, the same computation is performed assuming that the speed change is performed so as to run at operational points proximate to the path from $C_1$ to $D_1$ in FIG. 12 at the same distance and same time.

(4) Determination of Acceleration and Rapid Acceleration

Acceleration is determined by comparing the acceleration determination value (set to 0.2 [m/sec²], for example) with the degree of acceleration detected by the acceleration sensor 6, or with the degree of acceleration computed based on the speed detected by the vehicle speed signal, and when the detected degree of acceleration exceeds the specified degree of acceleration, it is determined that acceleration was performed.

When acceleration has been determined, a determination is further made as to whether it is rapid acceleration or not. Rapid acceleration is determined by comparing the detected degree of acceleration with the rapid acceleration determination value (set to 0.7 [mm/sec²], for example) in accordance with the rank of the driving skill of the driver (the rank of the level meter described below, or the rank related to acceleration), and if the detected degree of acceleration exceeds the rapid acceleration determination value, it is determined that rapid acceleration was performed.

The rapid acceleration determination value is set such that the higher the rank of the driving skill is, the lower the value; so, for example, when the rank of the driving skill is the lowest rank E, the rapid acceleration determination value is set to 0.7 [m/sec²], and as the rank rises, a smaller value is automatically updated.

The time in which the above-described acceleration is performed, and the time in which the rapid acceleration is performed are respectively recorded in the memory card 7.

(5) Determination of Deceleration and Rapid Deceleration

A determination is made in the same manner as that for the above-described acceleration and rapid acceleration, and when the detected degree of deceleration is greater than a deceleration determination value (0.2 [m/sec²], for example), deceleration is determined; and when the degree of deceleration is greater than a rapid deceleration determination value (0.7 [m/sec²], for example), rapid deceleration is determined. The rapid deceleration determination value is changed in accordance with the rank of the driving skill (the rank of the level meter described below, or the rank related to deceleration), and is set such that the higher the rank of the driving skill is, the lower the value. The time in which the above-described deceleration is performed, and the time in which the rapid deceleration is performed are respectively recorded in the memory card 7.

(6) Determination of Idling

When the vehicle is continuously stopped for a predetermined length of time X (20 seconds, for example) or longer, and the engine rotational speed is at an idling determination threshold value or less, it is determined that the vehicle is idling. The predetermined time X is set so as to exclude the signal wait time. The idling determination threshold value is set to a value less than the rotational speed under idleup control which is performed to increase the engine rotational speed when the output of the engine is used to drive a crane or other equipment for cargo operations. When it is determined that the vehicle is idling, then the idling time is measured and recorded in the memory card 7. The number of times the vehicle is stopped, the time the vehicle is stopped, the number of times the engine is stopped, the time the engine is stopped, and other factors are also recorded in the memory card 7.

(7) Determination of Excess Speed

The determination of excess speed is made by comparing the vehicle speed and the specified vehicle speed, and when the vehicle speed exceeds the specified vehicle speed, it is determined that the vehicle is running at excess speed. The specified vehicle speed is predetermined and is set to 50 [km/hour] for running on ordinary roads, and 80 [km/hour] for running on expressways. When it is determined that the vehicle is running at excess speed, the time run at excess speed is recorded in the memory card 7. The time run on an ordinary road and the time run on an expressway are recorded in the memory card 7.

(8) Determination of the Possibility of Shifting to a Higher Gear

The engine rotational speed and the maximum drive force when shifting to a higher gear by moving the select lever to the D-range is calculated in the same manner as in the process of step S39 in FIG. 10, and it is determined that shifting to a higher gear is possible when the engine rotational speed supposing a shift to a higher gear is higher than a specified value, and when the maximum drive force after shifting to a higher gear is greater than the current running resistance R (Rs+Rl+Rr). When it has been determined that a shift to a higher gear is possible, the time is recorded in the memory card 7. The time run in a gear position other than the top gear (2nd, 3rd, and 4th gears in the case of five forward gears), and in a gear position used during acceleration is recorded together in the memory card 7.

(9) Determination of Constant-Speed Running

A determination as to whether the vehicle is running at a constant speed is made based on the excess drive force, and it is determined that the vehicle is running at a constant speed when the excess drive force is small and the level meter 41 (described below) is not lit, or when only the green squares are lit for a continuous constant length of time or longer. The time during which it is determined that the vehicle is running at a constant speed is recorded in the memory card 7. The complete running time is also recorded together in the memory card 7 in order to investigate the frequency of the constant-speed running versus the complete running time.

(10) Determination of Racing

The determination as to whether the racing occurred is made on the basis of the vehicle speed, the engine rotational speed, and the accelerator operation amount, and it is determined that racing occurred when the engine rotational speed and the accelerator operation amount are not zero in a state in which vehicle speed is zero. The number of times that racing occurred is recorded in the memory card 7. The number of times the vehicle is stopped is also recorded in the memory card 7.

4. Display and Recording of the Operating Conditions

Computation and determination of the operating conditions are performed as described above, and the results thereof are displayed in real time on the display 4 of the onboard unit 1.

Figure 13:
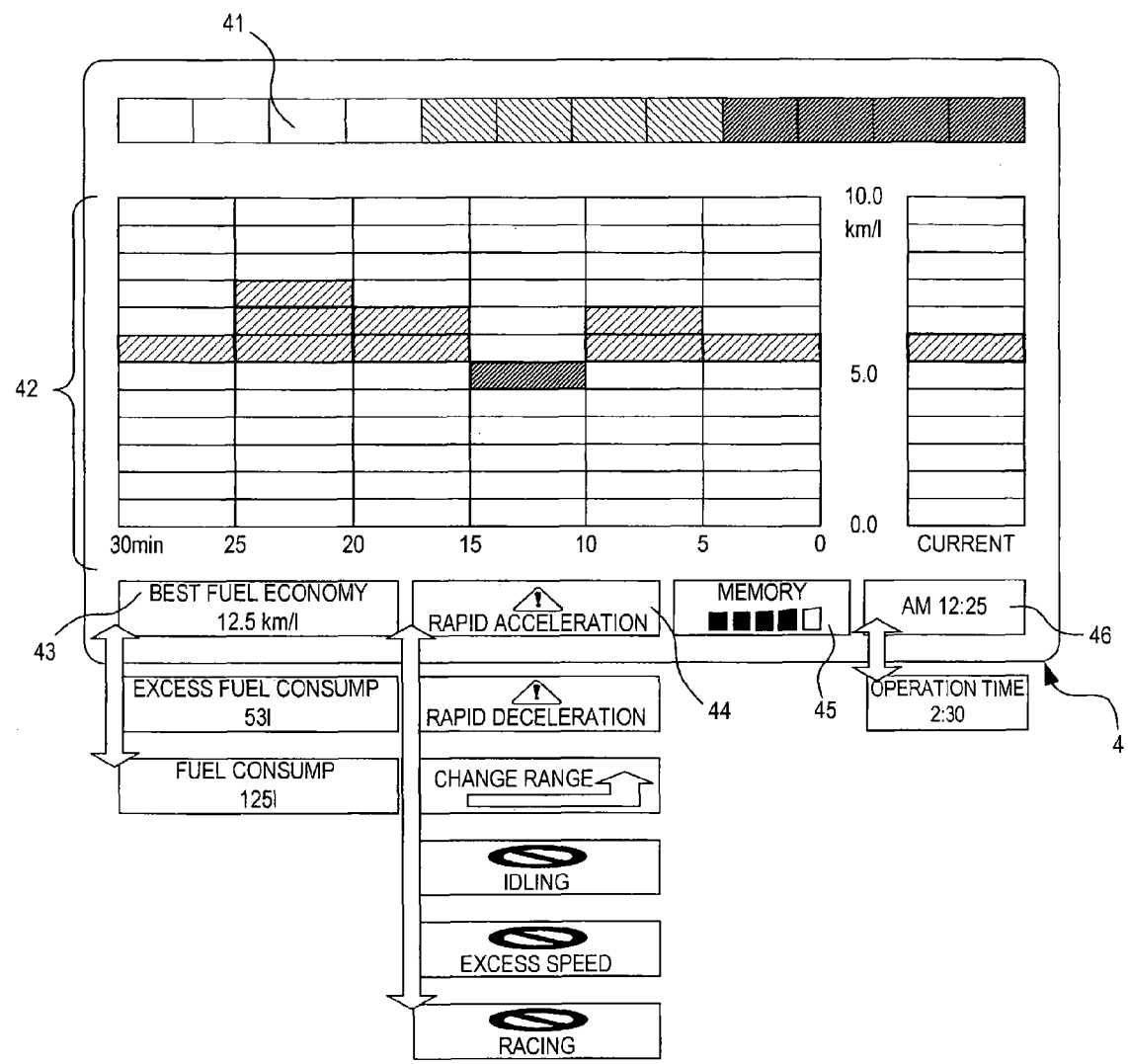
FIG. 13 is a diagram showing the display configuration.

FIG. 13 shows the configuration of the display 4. The display 4 comprises a level meter 41 for displaying the excess drive force ratio and other data, a fuel economy display area 42 for displaying the current and past fuel economy, an operating conditions display area 43 for displaying operating conditions of the excess fuel consumption and other data, a warning display area 44 for displaying warning messages when rapid acceleration is performed or the like, a memory remaining display area 45 for displaying the free capacity in the memory card 7, and a time display area 46 for selectively displaying the continuous operation time and the current time. Although the level meter 41 may also display values (ratios computed in steps S41, S42, S45, S46, S49, and S50 in FIG. 10) other than the excess drive force ratio, the description that follows will be centered on a case in which the excess drive force ratio is displayed.

The level meter 41 displays the magnitude of the excess drive force ratio in a bar graph style, and comprises 12 squares aligned in a row. As the excess drive force ratio increases, the lights light up beginning with the squares on the left side of the diagram, and the color of each square and the number of squares lit in accordance with the excess drive force ratio are changed in accordance with the rank of the driving skill.

Figure 14:
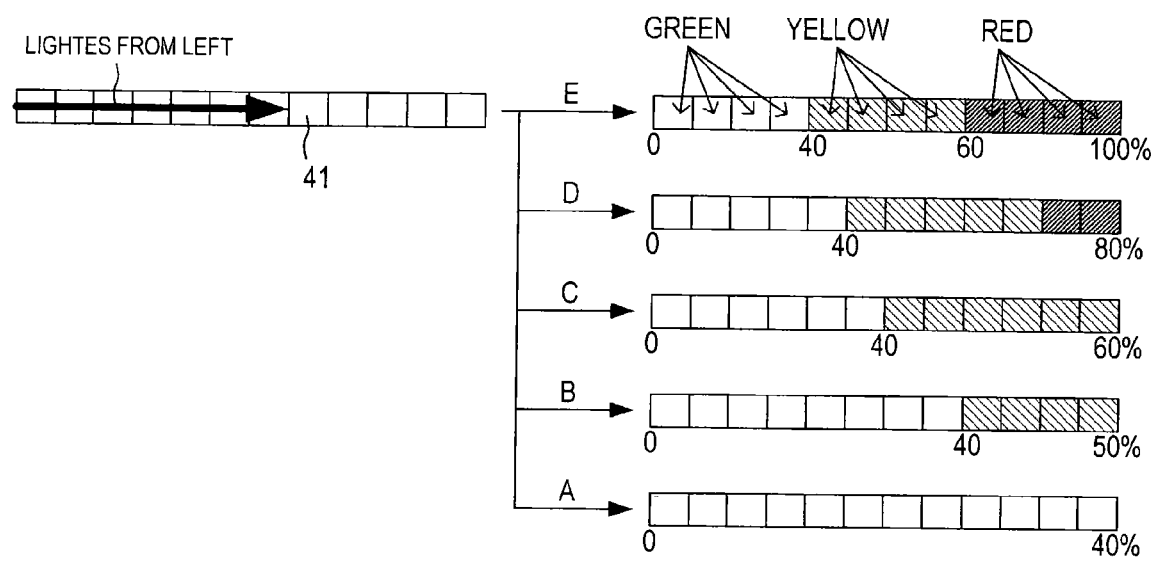
FIG. 14 is a graph for describing changes in the display format of the level meter.

FIG. 14 shows a situation where the display method of the level meter 41 is changed in accordance with the rank of the driving skill. The level meter 41 comprises 12 separate squares divided by the colors green, yellow, and red. At the lowest rank E, the unlit meter is set to correspond to 0% excess drive force ratio, the completely lit meter is set to correspond to the 100% excess drive force ratio. As the rank increases, the excess drive force ratio of the completely lit meter becomes smaller. The excess drive force ratio of the completely lit meter is 80% at the rank D, 60 at the rank C. It finally becomes 40% at the rank A.

When the excess drive force ratio is displayed as green from 0% to 40%, yellow from 40% to 60%, and red from 60% to 100%, the number of green, yellow, and red squares are four each at the lowest rank E; and when squares are lit in order from the left side in association with the increase in excess drive force, the driver attempts to drive to the extent possible so that the red lamps (or the yellow lamps) do not light. The excess drive force ratio, which is the goal of the driver at this time, is therefore about 40% to 60%.

When the rank of the driving skill rises and the green display area increases, the driver then attempts to drive so that the yellow lights do not light. The excess drive force ratio, which is the goal of the driver at this time, is therefore about 40%, and the goal of the driver has been raised higher than when at the rank E.

When the rank of the driving skill further rises to achieve the highest rank A and the color of the lit squares is completely green, the driver then attempts to drive so as to reduce the number of green lights that are lit. The excess drive force ratio, which is the goal of the driver at this time, therefore falls to 40% or less, and the goal of the driver has been raised yet higher.

Changing the display method in accordance with the rank of the driving skill allows a suitable goal for the driving skill of the driver to be set, and improvement in driving skill can be expected for both proficient and unskilled drivers.

Returning to FIG. 13 and describing the display 4 in greater detail, the current fuel economy and changes in the fuel economy over the previous 30 minutes are displayed in the fuel economy display area 42, and the driver can understand how the fuel economy changes due to his/her own driving operation. When the fuel economy is better than the standard fuel economy (5.0 [km/l], in this case), only the number of squares on the upper side of the center light up in accordance with the difference in relation to the standard fuel economy, and when the fuel economy is worse than the standard fuel economy only the number of squares on the lower side of the center light up in accordance with the difference in relation to the standard fuel economy.

In addition to the excess fuel consumption computed by the above-described computation process, the best fuel economy, the fuel consumption up to this point, and other data are selectively displayed in the operating conditions display area 43.

When it is determined based on the above-described determination process that rapid acceleration has occurred, rapid deceleration has occurred, shifting to a higher gear is possible by operating the select lever, the vehicle is currently idling, or racing occurred, then a warning message is displayed to the driver in the warning display area 44 in accordance with the content of the determination. When a warning message has been displayed, the driver can know in particular that the driving operation that worsened the fuel economy because the excess fuel consumption also increases and this can serve as a reference for the driver to improve driving operation. The warning method may be a method for issuing a warning sound, or a method for playing a voiced warning message.

The above-described configuration shows an example of a system to which this invention has been applied, and the scope of this invention is not limited to the above-described configuration. This invention may be applied to a system with a configuration differing from the configuration shown herein, and, for example, the vehicle database may be built into the onboard unit 1, and vehicle selection and generation of an overall performance map may be performed by the onboard unit 1. Analysis and display of the recorded operating conditions may also be performed by the onboard unit 1.

In the above embodiment, the overall engine performance map is created based on the fuel consumption ratio characteristics prepared in advance and the actual known fuel consumption ratio under certain operating conditions, but if the overall engine performance map can be obtained, then this may also be used.

Data transactions between the onboard unit 1 and the monitoring computer 2 may be performed by a method other than by transmission to a memory card 7, and transmission to a magnetic disk, or transmission by wireless is also possible.

The operating state of the constant speed control device 10 is inferred from the operating conditions of the vehicle, but an operating signal showing that the constant speed control device 10 is operating is outputted to the engine control unit from the constant speed control device 10 while the constant speed control device 10 is operating, so the operating state of the constant speed control device 10 may also be determined by receiving this signal.

The above-described vehicle further comprises both a constant speed control device 10 and an automatic transmission 27 with a torque converter 20, but this invention can be applied to vehicles comprising only one or the other.

This invention can further be applied to vehicles comprising a device for maintaining vehicular spacing which control the vehicle speed so as to maintain a set vehicular spacing in lieu of the constant speed control device 10 or in addition to the constant speed control device 10, and the same effect as that described above can be obtained.

What is claimed is:

1. An evaluation system for vehicle operating conditions, comprising:

an automatic control device which sets target vehicle operating conditions and controls the vehicle so as to achieve the target operating conditions;

a controller that functions to:

determine whether an operation that worsens fuel economy has been performed based on the operating conditions of the vehicle;

determine the operating state of the automatic control device based on the operating conditions of the vehicle; and compute an excess fuel consumption which is a fuel amount consumed in excess by the operation that worsens the fuel economy based on the operations conditions of the vehicle and the operating state of the automatic control device, and a display device which displays the computed excess fuel consumption;

wherein the controller further functions to:

compute an assumed fuel consumption based on the assumption that the operation that worsens the fuel economy has not been performed; and subtract the assumed fuel consumption from an actual fuel consumption to compute the excess fuel consumption:

wherein the automatic control device is an automatic transmission comprising a torque converter, and the controller further functions to detect the operating state of the automatic transmission based on an input/output rotational speed ratio, which is the ratio between a rotational speed of the engine and an output rotational speed of the torque converter;

wherein the controller further functions to:

calculate a torque ratio and a power transmission efficiency of the torque converter from the input/output rotational speed and characteristics of the torque converter; and compute the fuel amount consumed in excess by the slippage of the torque converter based on the torque ratio and the power transmission efficiency of the torque converter; and wherein the controller further functions to:

compute a fuel consumption ratio and a torque of the engine based on the rotational speed of the engine, either one of an accelerator operation amount and a value equivalent to the accelerator operation amount, and characteristics of the engine;

compute an output of the engine from the torque and the rotational speed of the engine;

compute fuel consumption from the fuel consumption ratio and the output of the engine; and compute the fuel amount consumed in excess by the slippage of the torque converter from the fuel consumption and the fuel amount that is obtained by multiplying the fuel consumption ratio by the work ratio at which the vehicle runs against resistance.

2. An evaluation system for vehicle operating conditions, comprising:

an automatic control device which sets target vehicle operating conditions and controls the vehicle so as to achieve the target operating conditions;

a controller that functions to:

determine whether an operation that worsens fuel economy has been performed based on the operating conditions of the vehicle;

determine the operating state of the automatic control device based on the operating conditions of the vehicle; and compute an excess fuel consumption which is a fuel amount consumed in excess by the operation that worsens the fuel economy based on the operating conditions of the vehicle and the operating state of the automatic control device, and a display device which displays the computed excess fuel consumption;

wherein the controller further functions to:

compute an assumed fuel consumption based on the assumption that the operation that worsens the fuel economy has not been performed; and subtract the assumed fuel consumption from an actual fuel consumption to compute the excess fuel consumption;

wherein the automatic control device is an automatic transmission comprising a torque converter, and the controller further functions to detect the operating state of the automatic transmission based on an input/output rotational speed ratio, which is the ratio between a rotational speed of the engine and an output rotational speed of the torque converter;

wherein the controller further functions to:

determine that the automatic transmission is in a lockup state when the actual rotational speed of the engine and the rotational speed of the engine calculated from the speed ratio and the rotational speed of the driving axle or driving wheel are equal to each other; and when the automatic transmission is in a lockup state, compute the power transmission efficiency and the input/output rotational speed ratio of the torque converter to be both 1.

* * * * *